US012304221B2

(12) United States Patent
Kano

(10) Patent No.: US 12,304,221 B2
(45) Date of Patent: May 20, 2025

(54) PRINTING DEVICE

(71) Applicant: Brother Kogyo Kabushiki Kaisha, Nagoya (JP)

(72) Inventor: Yasutoshi Kano, Kariya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 147 days.

(21) Appl. No.: 18/162,424

(22) Filed: Jan. 31, 2023

(65) Prior Publication Data

US 2023/0166528 A1 Jun. 1, 2023

Related U.S. Application Data

(63) Continuation of application No. PCT/JP2021/026770, filed on Jul. 16, 2021.

(30) Foreign Application Priority Data

Jul. 31, 2020 (JP) ................................ 2020-131097

(51) Int. Cl.
*B41J 2/325* (2006.01)

(52) U.S. Cl.
CPC .................................... *B41J 2/325* (2013.01)

(58) Field of Classification Search
CPC ........ B41J 2/325; B41J 2202/31; B41J 35/28; B41J 17/32
USPC ........................................................ 347/213
See application file for complete search history.

(56) References Cited

U.S. PATENT DOCUMENTS

2006/0221171 A1* 10/2006 Watanabe ................ B41J 29/38 347/215
2008/0213023 A1* 9/2008 Koizumi .................. B41J 17/32 400/208
2019/0299689 A1 10/2019 Kondo

FOREIGN PATENT DOCUMENTS

| | | | |
|---|---|---|---|
| JP | S63-092766 | A | 6/1988 |
| JP | S63-092766 | U | 6/1988 |
| JP | H09-020042 | A | 1/1997 |
| JP | 2005-246873 | A | 9/2005 |
| JP | 2018-202630 | A | 12/2018 |
| JP | 2019-217727 | A | 12/2019 |

(Continued)

OTHER PUBLICATIONS

Aug. 24, 2021—International Search Report—Intl App PCT/JP2021/026770.

(Continued)

*Primary Examiner* — Jason S Uhlenhake
*Assistant Examiner* — Alexander D Shenderov
(74) *Attorney, Agent, or Firm* — Banner & Witcoff, Ltd.

(57) ABSTRACT

A printing device includes a main body, and a cassette attached to and detached from the main body. A locating shaft is provided on a back surface of the cassette. A ball that can protrude toward an outer side is provided in the locating shaft. A cylindrical guide body is provided at a position facing the locating shaft on a front surface of the main body. The cylindrical guide body guides and locates the locating shaft to a predetermined position on a side of the main body along an axis direction. When the locating shaft is located at the predetermined position, the ball engages with an engaged hole provided in the cylindrical guide body. The locating shaft is locked to the cylindrical guide body. A release button is pressed down by a user to release locking performed by the ball.

8 Claims, 16 Drawing Sheets

(56) References Cited

FOREIGN PATENT DOCUMENTS

| | | | |
|---|---|---|---|
| WO | 2008-105528 | A1 | 9/2008 |
| WO | 2011-115594 | A1 | 9/2011 |

OTHER PUBLICATIONS

Jan. 31, 2023—(US) International Preliminary Report on Patentability—App PCT/JP2021/026770.
May 24, 2024—(EP) Extended Search Report—App 21851117.8.
Jun. 4, 2024—(JP) Notice of Reasons for Refusal—App 2022-540184.

* cited by examiner

PRINTING DEVICE

REFERENCE TO RELATED APPLICATIONS

This is a continuation application of International Application No. PCT/JP2021/026770 filed on Jul. 16, 2021 which claims priority from Japanese Patent Application No. 2020-131097 filed on Jul. 31, 2020. The entire contents of the earlier applications are incorporated herein by reference.

BACKGROUND ART

A thermal transfer type printing device is known in which a ribbon cassette supporting an ink ribbon is attached to and detached from a printing device main body. Two locating guide shafts and a slider operation unit are provided on a cassette base of the ribbon cassette. The two locating guide shafts are provided at both left and right ends of the cassette base, and extend parallel to an attachment and detachment direction of the ribbon cassette. The slider operation unit is provided to be movable in a left-right direction. Inside the cassette base, an interlocking bar is provided to be movable in the left-right direction in conjunction with the slider operation unit, and locking claws are respectively provided at both left and right end portions of the interlocking bar.

When the ribbon cassette is mounted to the printing device main body, the two locating guide shafts are respectively inserted and fitted into two positioning guide holes provided in the printing device main body. After the ribbon cassette is mounted, the two locking claws move in the left-right direction in conjunction with the slider operation unit via the interlocking bar by an operation of the slider operation unit, so that the two locking claws are respectively locked to two locked portions provided on a printing device main body side, and a mounted state is locked.

In the printing device described above, a guide mechanism including the locating guide shafts and the positioning guide holes, and a locking mechanism including the locking claws and the locked portions are provided at different positions independently of each other. Therefore, a problem arises that a space in the device is narrow.

DESCRIPTION

An object of the present disclosure is to provide a printing device in which a wide space in the device can be used.

A printing device of the 1st aspect includes: a main body having a head support surface on which a thermal head is supported; and a cassette including a plate-shaped cassette base, a supply roll shaft, and a winding roll shaft, and detachably attached to the head support surface of the main body along an axis direction of the supply roll shaft and the winding roll shaft, the supply roll shaft rotatably supporting a ribbon supply roll and being provided on one side, in a predetermined direction, of a facing surface of the cassette base facing the head support surface, and the winding roll shaft rotatably supporting a ribbon winding roll and being provided on an other side, in the predetermined direction, of the facing surface, in which the printing device is configured to perform printing by transferring ink of an ink ribbon onto a print medium due to heating of the thermal head, and the ink ribbon is fed out from the ribbon supply roll and wound around the ribbon winding roll through the thermal head, and in which the printing device further includes: a guided portion provided on the facing surface of the cassette base; a guide portion provided at a position facing the guided portion on the head support surface of the main body, and configured to guide and locate the guided portion to a predetermined position on a side of the head support surface along the axis direction; a lock unit provided in the guided portion and configured to lock the guided portion to the guide portion in a state where the guided portion is located at the predetermined position by the guide portion; and a release unit configured to release locking performed by the lock unit. According to the printing device of the aspect, since the lock unit is provided at the guide portion provided on the head support surface of the main body, the guide portion and the lock unit can be provided at the same position. Therefore, the printing device can effectively use a limited space in the printing device as compared with a configuration in which the guide portion and the lock unit are provided at different positions. Since the guided portion can be locked to the guide portion in the state where the guided portion is guided and located to the predetermined position by the guide portion, guiding and locking operations of the guided portion can be performed by a series of actions. As a result, the printing device can improve usability. The "predetermined position" means a predetermined position of the guided portion with respect to the guide portion in a state where the cassette is normally mounted to the main body in an attachment and detachment direction of the cassette.

The guided portion of the printing device of the 2nd aspect may be provided between the supply roll shaft and the winding roll shaft in the predetermined direction on the facing surface of the cassette base, and may be provided, in a state where the cassette is mounted, at a location on a side opposite to the thermal head with respect to the supply roll shaft in an orthogonal direction that is orthogonal to the predetermined direction and the axis direction. Therefore, the cassette base is supported in a balanced manner in the predetermined direction with respect to the head support surface of the main body. A space between the supply roll shaft and the winding roll shaft is limited by a thickness of each of the ribbon supply roll and the ribbon winding roll, but the limited space in the printing device can be more effectively used by providing the guided portion in a dead space on the side opposite to the thermal head with respect to the supply roll shaft in the orthogonal direction.

The printing device of the 3rd aspect may further include a grip portion provided on an outer surface of the cassette base on a side opposite to the facing surface, and configured to be gripped by a user, and the release unit may be provided in the grip portion. In the printing device of the aspect, since the release unit is provided in the grip portion, the user can perform a release operation while gripping the grip portion. As a result, the aspect can provide the printing device having high usability.

The guided portion of the printing device of the 4th aspect may include a rod-shaped shaft extending from the facing surface toward a side of the head support surface in parallel with the axis direction, the guide portion may include a cylindrical guide body extending from the head support surface toward a side of the facing surface in parallel with the axis direction, and configured to guide and locate the shaft to the predetermined position by inserting the shaft inside the cylindrical guide body, the lock unit may include: an engagement portion provided to be cable of protruding from an opening portion from an inner side toward an outer side of the shaft in a radial direction, and being engageable with an engaged hole through the opening portion in a state where the shaft is guided to the predetermined position by the cylindrical guide body, the opening portion being provided on an outer peripheral surface of the shaft, and the engaged hole is provided in an outer peripheral surface of the cylindrical guide body, and the release unit may be provided in the shaft, and may be configured to move the engagement portion to the inner side in the radial direction to disengage the engagement portion from the engaged hole. According to the printing device of the aspect, the shaft is automatically guided to the predetermined position by inserting the shaft into the cylindrical guide body. The engagement portion engages with the engaged hole in a state where the shaft is guided to the predetermined position, so that the shaft is locked to the cylindrical guide body. Guiding and locking can be simultaneously performed by one action of inserting the shaft into the cylindrical guide body, so that operability is improved. The locking can be easily released by disengaging the engagement portion from the engaged hole.

The shaft of the printing device of the 5th aspect may include: a cylindrical holder fixed to the facing surface and extending in parallel with the axis direction toward the side of the head support surface; and a cylindrical guide shaft coaxially disposed in the holder and extending from a tip end portion of the holder toward the side of the head support surface, the tip end portion facing the side of the head support surface, the release unit may include: a rod-shaped center shaft disposed in the holder and the guide shaft and provided to be movable along a length direction of the holder and the guide shaft, the lock unit may include: a first biasing member configured to constantly bias the center shaft toward a side of the cassette base, the engagement portion may be a spherical body, and may be provided between the guide shaft and the center shaft, the spherical body being disposed to be slidable on an outer peripheral surface of the center shaft, and a part of the spherical body being exposed from the opening portion to engage with the engaged hole in a first state where the spherical body is in contact with the outer peripheral surface of the center shaft moved toward the side of the cassette base by the first biasing member, a recessed portion recessed toward an inner side of the center shaft in a radial direction may be provided on the outer peripheral surface of the center shaft at a position closer to the side of the cassette base than a position with which the part of the spherical body is in contact in the first state, and the release unit may be configured to shift from the first state to a second state where the spherical body is in contact with the recessed portion and to disengage the spherical body from the engaged hole by moving the center shaft toward the side of the head support surface against a biasing force of the first biasing member and disposing the recessed portion at a position of the spherical body, to release the locking. According to the printing device of the aspect, by moving the center shaft within the guide shaft and causing the center shaft to be the first state, a part of the spherical body can be exposed from the opening portion and can engage with the engaged hole, and the shaft can be locked to the cylindrical guide body. By switching the center shaft from the first state to the second state, the spherical body moves inward from the opening portion to be disengaged from the engaged hole, so that the locking can be easily released.

The guide shaft of the printing device of the 6th aspect may be supported in the holder to be rotatable about an axis, and the printing device may include: a second biasing member provided in the holder and configured to constantly bias the guide shaft in one direction about the axis; and a guide groove provided on the outer peripheral surface of the cylindrical guide body, extending from one end portion of the cylindrical guide body toward the engaged hole to be inclined in a direction opposite to the one direction about the axis, and configured to guide the part of the spherical body exposed from the opening portion from the one end portion to the engaged hole, the one end portion facing the side of the cassette base. The shaft is inserted along an inside of the cylindrical guide body, and a part of the spherical body exposed from the opening portion of the shaft is pushed toward the side of the head support surface along the guide groove. At this time, since the spherical body is guided along the guide groove in a direction opposite to a biasing direction of the second biasing member, the guide shaft rotates in the same direction together with the spherical body. When the spherical body is guided to the engaged hole, the guide shaft is biased in the one direction about the axis and pulled back by the second biasing member, and the spherical body engages with the engaged hole to perform the locking. As a result, the guiding and the locking can be performed by only one action of inserting the shaft into the cylindrical guide body.

The second biasing member of the printing device of the 7th aspect may be a torsion coil spring. As a result, a biasing force can be easily applied to the guide shaft in the one direction about the axis.

The release unit of the printing device of the 8th aspect may include an operation unit fixed to one end portion of the center shaft located on a side of the holder, and configured to push the center shaft toward the side of the head support surface. Since the user can release the locking only by pushing the operation unit toward the side of the head support surface, the release operation can be performed more easily. Therefore, the printing device can improve the usability.

The shaft of the printing device of the 9th aspect may include: a cylindrical holder fixed to the facing surface and extending in parallel with the axis direction toward the side of the head support surface; and a cylindrical guide shaft coaxially disposed in the holder and extending from a tip end portion of the holder toward the side of the head support surface, the tip end portion facing the side of the head support surface the release unit may include: a rod-shaped first shaft and a rod-shaped second shaft disposed in the holder and the guide shaft, and coaxially provided to be movable along a length direction of the holder and the guide shaft, the cylindrical guide body may include an abutment portion configured to, in a state where the cassette is mounted to the main body, abut against the second shaft to restrict the guide shaft from moving toward the side of the head support surface in the length direction of the guide shaft, the lock unit may include: a third biasing member disposed between the first shaft and the second shaft, and configured to bias the first shaft toward a side of the cassette base in a state where the cassette is mounted to the main body, the engagement portion may be a spherical body, and may be provided between the first shaft and the center shaft, the spherical body being disposed to be slidable on an outer peripheral surface of the first shaft, and a part of the spherical body being exposed from the opening portion to engage with the engaged hole in a locked state where the spherical body is in contact with the outer peripheral surface of the first shaft moved toward the side of the cassette base by the third biasing member, a recessed portion recessed toward an inner side of the first shaft in a radial direction may be provided on the outer peripheral surface of the first shaft at a position closer to the side of the cassette base than a position with which the part of the spherical body is in contact in the locked state, and the release unit may be configured to shift from the locked state to a released state where the spherical body is in contact with the recessed portion and to disengage the spherical body from the engaged hole by moving the first shaft toward the side of the head support surface against a biasing force of the third biasing member and disposing the recessed portion at a position of the spherical body, to release the locking. According to the printing device of the aspect, by moving the first shaft within the guide shaft and causing the first shaft to be the locked state, a part of the spherical body can be exposed from the opening portion and can engage with the engaged hole, and the shaft can be locked to the cylindrical guide body. By switching the first shaft from the locked state to the released state, the spherical body moves inward from the opening portion to be disengaged from the engaged hole, so that the locking can be easily released.

FIG. 1 is a perspective view of a printing device 1.

FIG. 2 is a perspective view of the printing device 1 in a state where a cassette 4 is pulled out forward from a main body 3.

Figure 1:
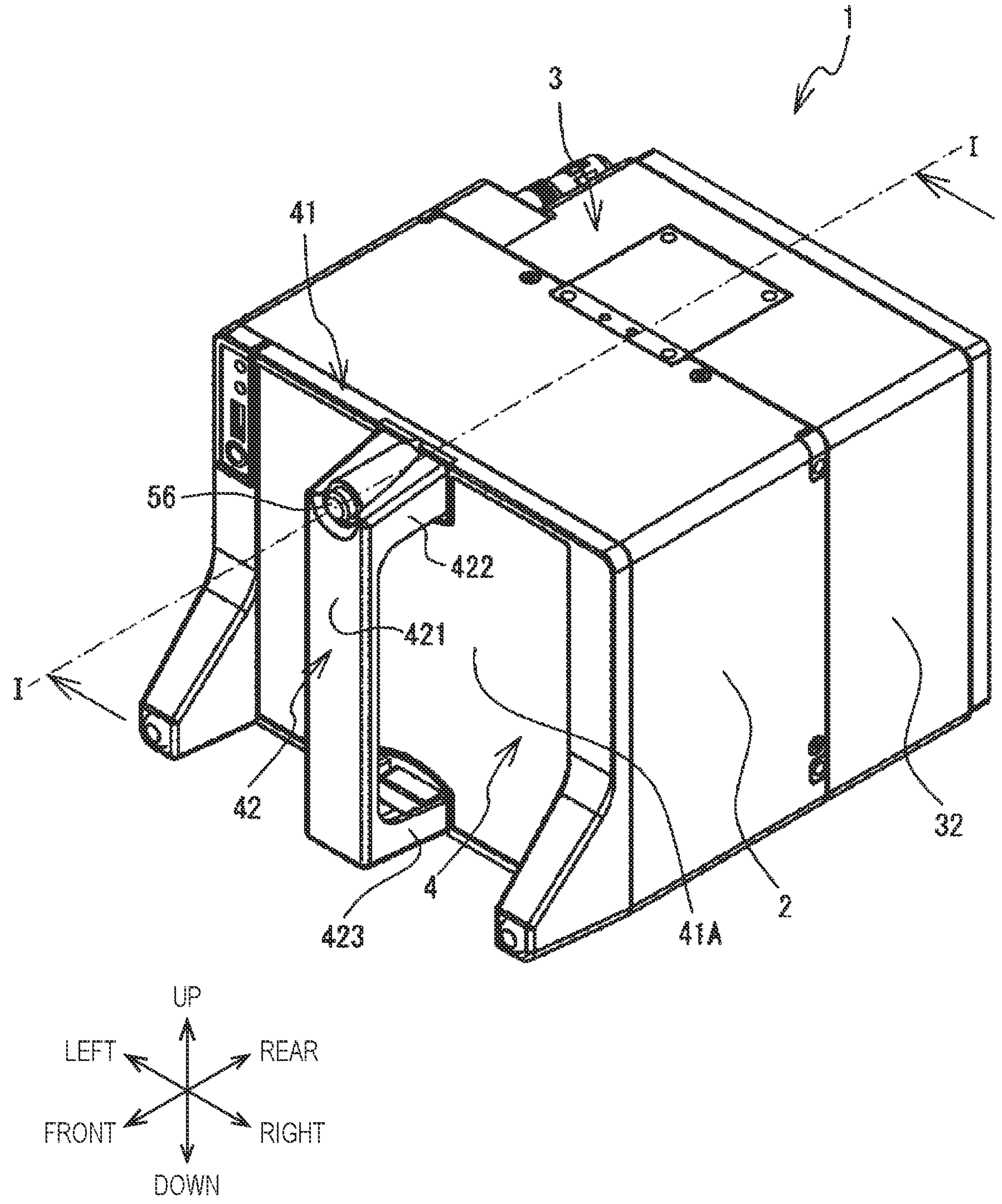

Embodiments of the present disclosure will be described with reference to the drawings. In the following description, left and right, front and rear, and up and down indicated by arrows in the drawings are used. A printing device 1 shown in FIG. 1 can print desired characters and graphics by allowing a belt-shaped packaging material (not shown) fed out from a packaging material supply roll (not shown) to pass through a lower portion from left to right.

Figure 2:
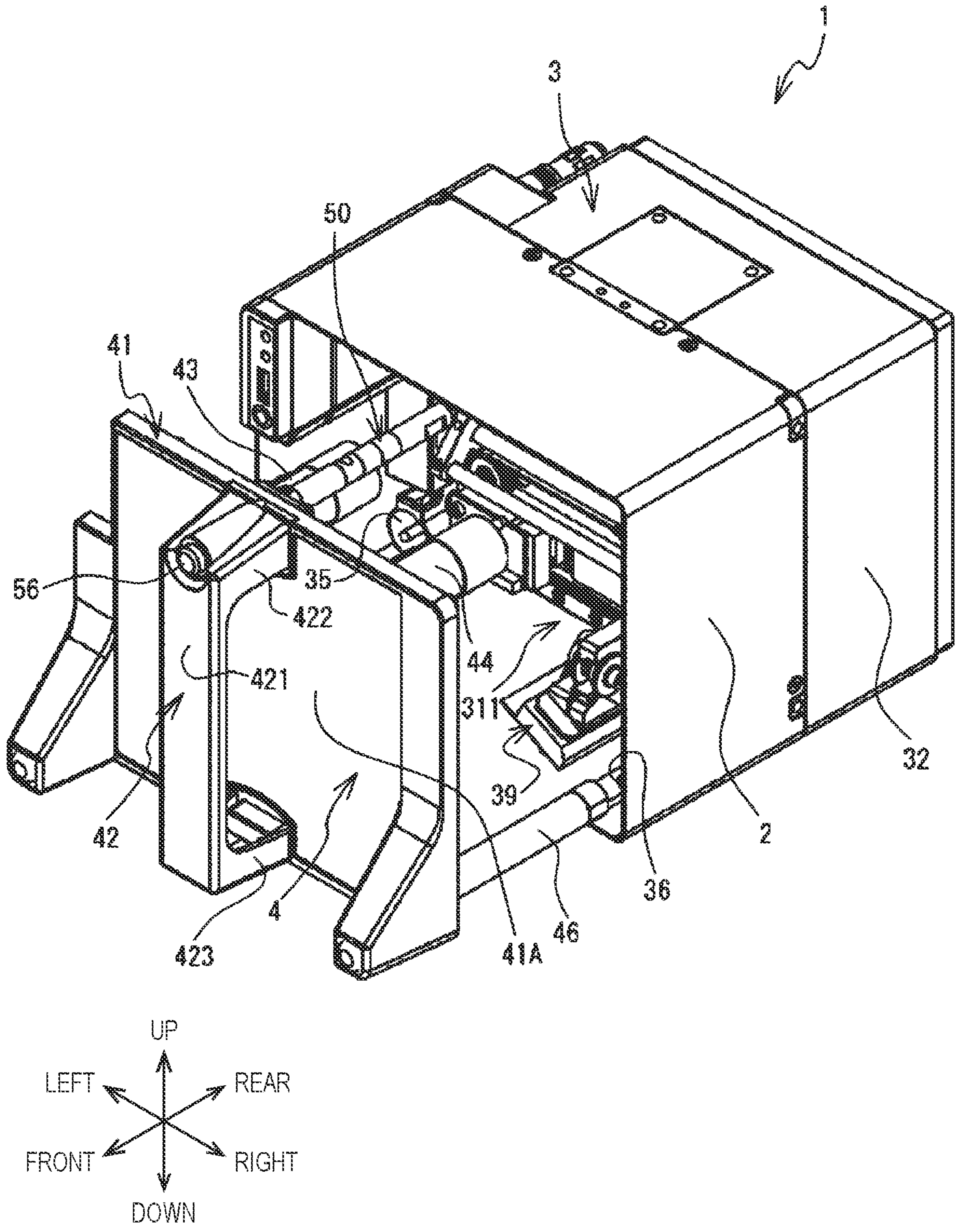
Figure 4:
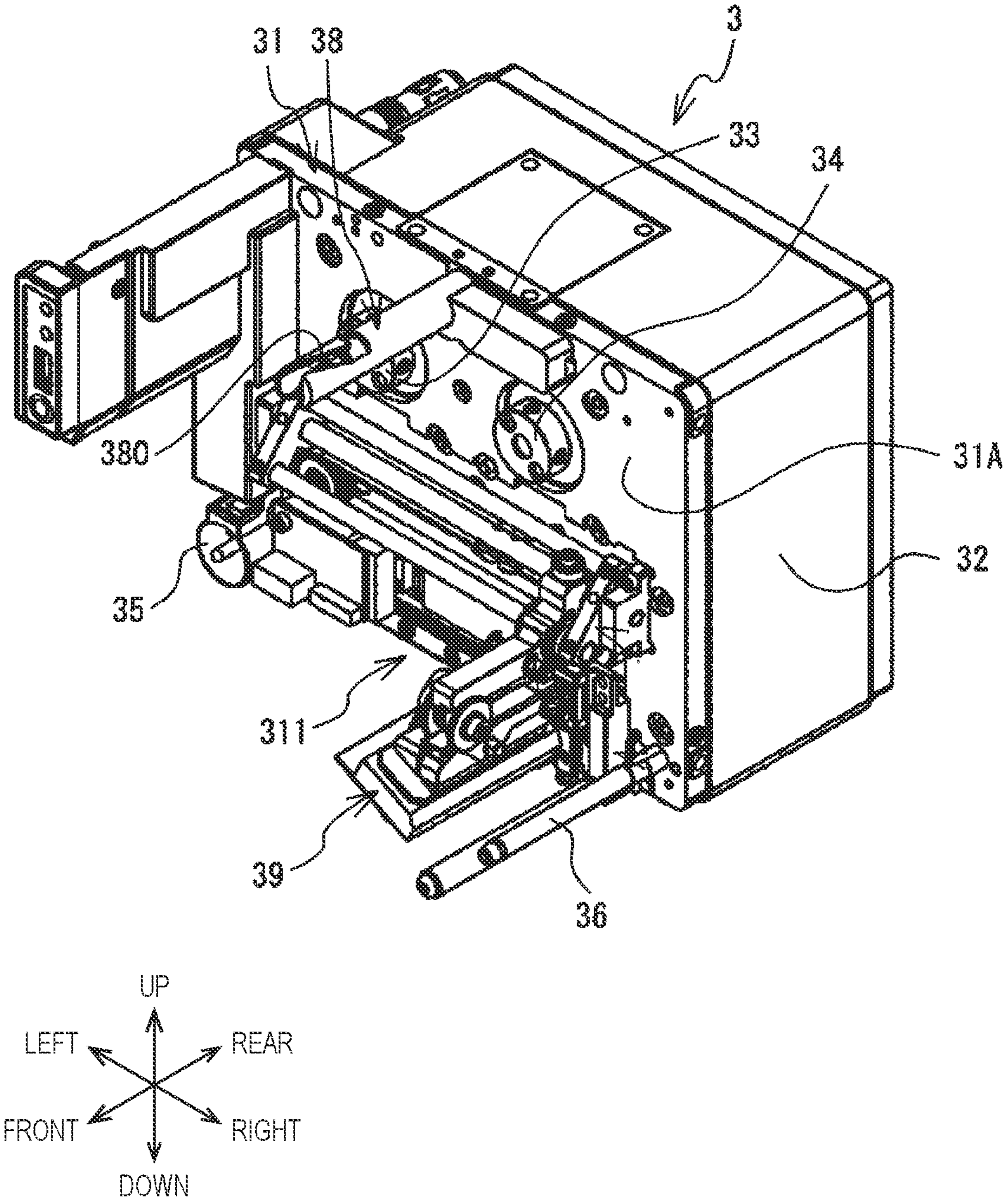
FIG. 4 is a perspective view of the main body 3.
Figure 5:
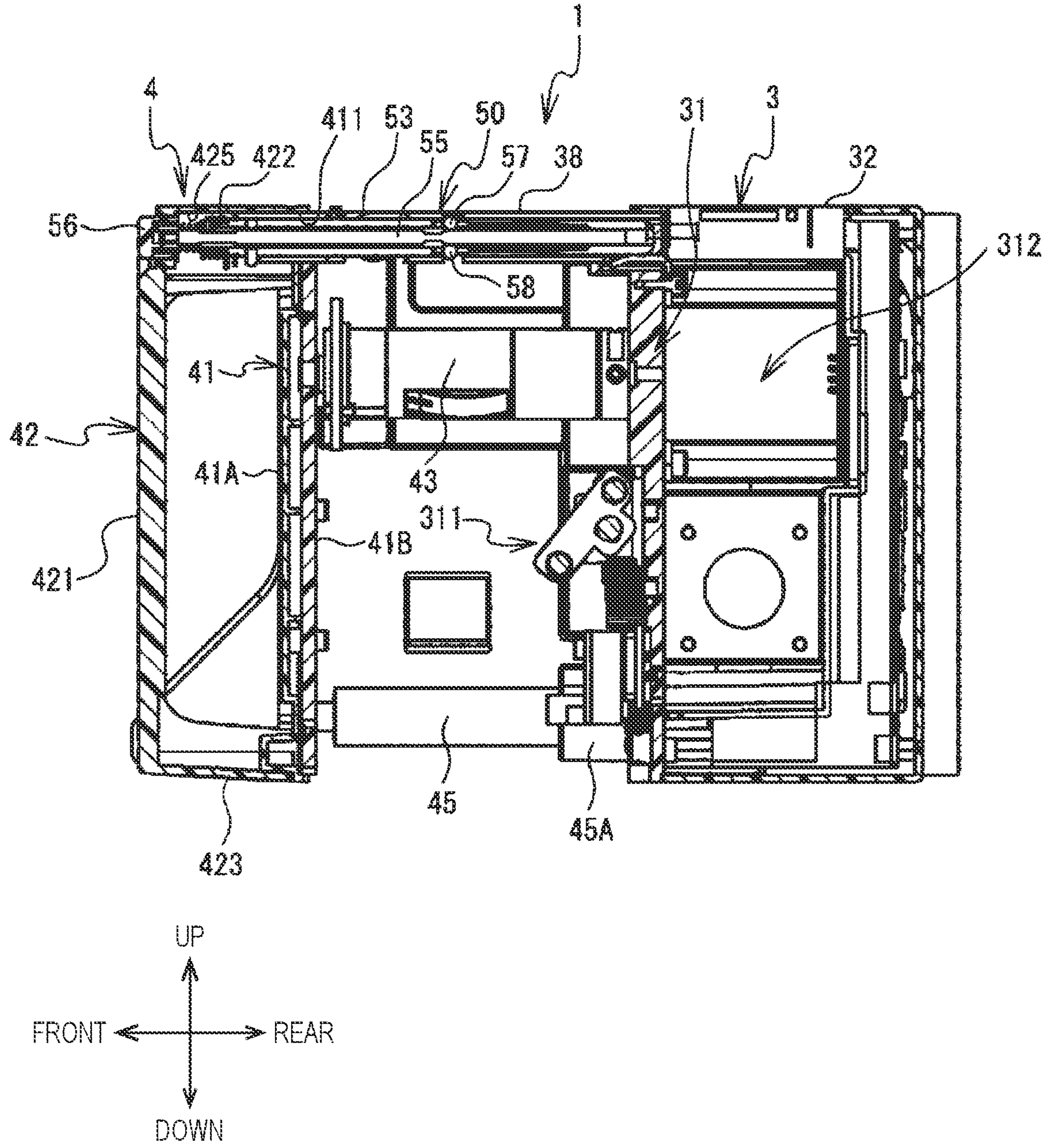
FIG. 5 is a cross-sectional view taken along a line I-I shown in FIG. 1, when viewed from an arrow direction.

A configuration of the printing device 1 will be described. As shown in FIG. 1, the printing device 1 is formed in a substantially rectangular parallelepiped shape, and includes an outer decorative plate 2. The outer decorative plate 2 covers an outer peripheral surface of the printing device 1 around an axis in a front-rear direction, and can be attached to and detached from the printing device 1. In FIGS. 4 and 5, the outer decorative plate 2 is not shown. The printing device 1 includes a main body 3 and a cassette 4 which are separable from each other in the front-rear direction. The outer decorative plate 2 can be mounted on a side of the main body 3, and the cassette 4 is inserted inside the outer decorative plate 2. As shown in FIG. 2, the cassette 4 can be attached to and detached from the main body 3 by being inserted and pulled out along an axis direction (front-rear direction) of a supply roll shaft 43 and a winding roll shaft 44 which are provided on a side of the cassette 4 and which will be described later.

Figure 3:
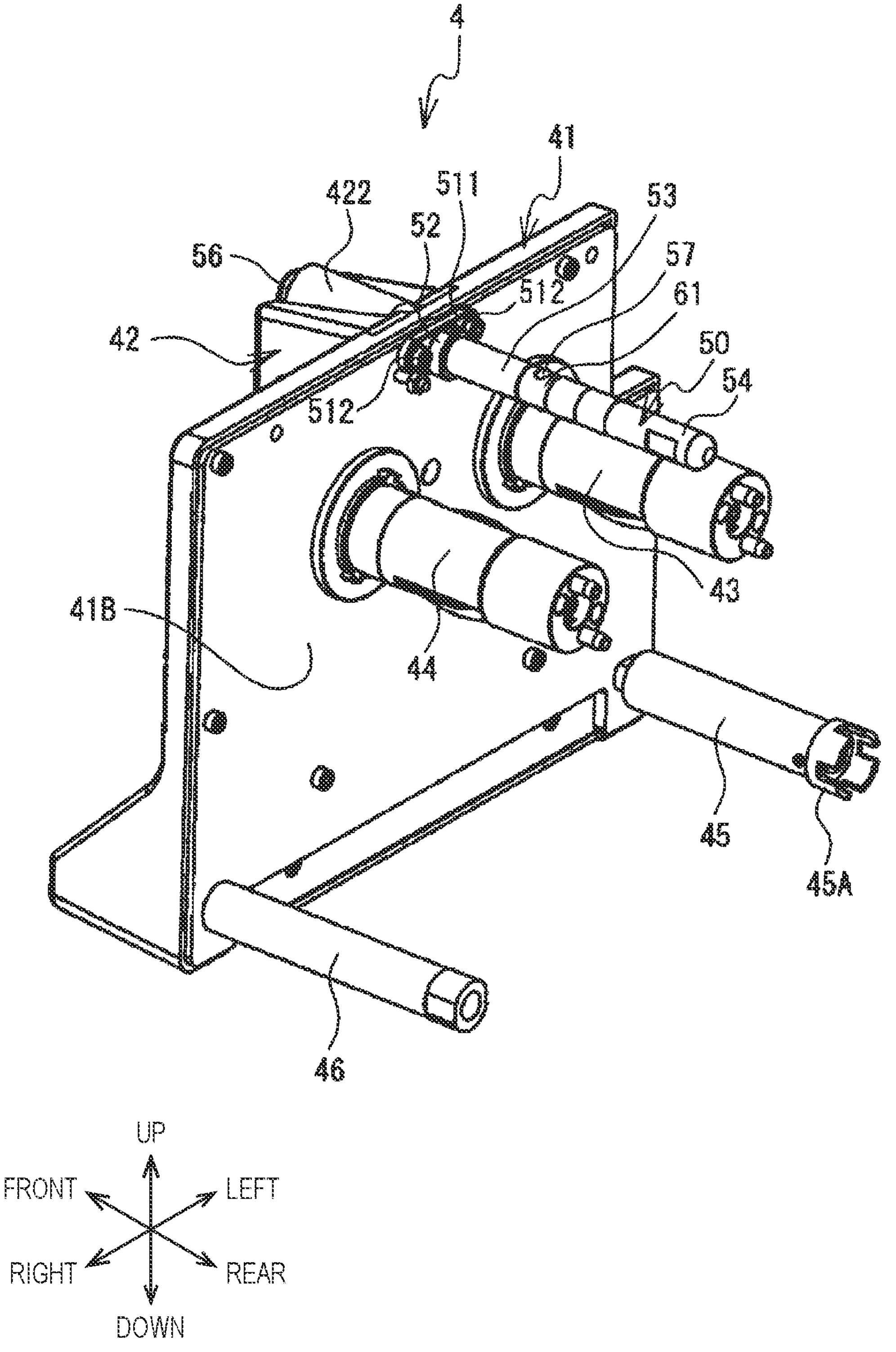
FIG. 3 is a perspective view of the cassette 4.

A structure of the cassette 4 will be described. As shown in FIGS. 2 and 3, the cassette 4 is disposed on a front side of the printing device 1, and includes a cassette base 41, a handle 42, the supply roll shaft 43, the winding roll shaft 44, two guide rollers 45 and 46, a locating shaft 50, and the like.

The cassette base 41 is formed in a substantially rectangular shape in a front view. The handle 42 is provided on a side of a front surface 41A of the cassette base 41, and includes a grip portion 421, an upper support portion 422, and a lower support portion 423. The grip portion 421 is provided at a position spaced forward from a front surface 41A to extend in an up-down direction, and is gripped by a user. The upper support portion 422 bridges between a central portion of an upper end portion of the cassette base 41 and an upper end portion of the grip portion 421. The lower support portion 423 bridges between a central portion of a lower end portion of the cassette base 41 and a lower end portion of the grip portion 421. As a result, the handle 42 is provided to bridge, in the up-down direction, between the respective central portions of the upper end portion and the lower end portion of the cassette base 41. The handle 42 is gripped by the user when the cassette 4 is to be attached to and detached from the main body 3. A release button 56 is provided in an upper portion of a front surface of the grip portion 421. The release button 56 is pressed down from a front by the user in order to release locking to the main body 3 by the locating shaft 50 to be described later.

As shown in FIG. 3, the supply roll shaft 43 and the winding roll shaft 44 are provided side by side in a left-right direction on a back surface 41B of the cassette base 41 and above a central position in the up-down direction. The supply roll shaft 43 is disposed on a left side, and the winding roll shaft 44 is disposed on a right side. The supply roll shaft 43 and the winding roll shaft 44 are provided to extend rearward from the back surface 41B, and are each provided to be rotatable about a central axis. One end of a series of belt-shaped ink ribbons (not shown) is fixed to the supply roll shaft 43 in advance and the ink ribbons are wound around the supply roll shaft 43 in advance. The other end of the ink ribbons is fixed to the winding roll shaft 44, so that the ink ribbons fed out from the supply roll shaft 43 are wound into a roll shape.

The guide roller 45 is provided at a lower left corner portion of the back surface 41B. The guide roller 46 is provided at a lower right corner portion of the back surface 41B. The guide rollers 45 and 46 are provided to extend rearward from the back surface 41B, and are each provided to be rotatable about a central axis. The ink ribbons fed out from the supply roll shaft 43 are finally guided to the winding roll shaft 44 through a conveyance path that is bent by abutting against outer peripheral surfaces of the two guide rollers 45 and 46.

The locating shaft 50 is provided in a central upper portion, between the supply roll shaft 43 and the winding roll shaft 44, of the back surface 41B. The position is in a (central in an example) region between the supply roll shaft 43 and the winding roll shaft 44 in the left-right direction, and is located substantially at an upper end of the cassette base 41 in the up-down direction. The position is a position that does not interfere with feeding out and winding of the ink ribbons regardless of an used amount of the ink ribbons as described later, and does not hinder an operation of a thermal head 39 since the position is located, even when the cassette 4 is mounted, on a side opposite to a lower side where the thermal head 39 is located. A through hole 411 is provided at a position on the back surface 41B where the locating shaft 50 is provided (see FIG. 5). The through hole 411 penetrates the cassette base 41 in the front-rear direction, and communicates in the front-rear direction with an insertion hole 425 (see FIG. 6) provided inside the upper support portion 422 of the handle 42. The insertion hole 425 extends in the front-rear direction, and a front end portion thereof is open at the upper portion of the front surface of the grip portion 421 (see FIG. 1).

The locating shaft 50 is formed in a rod shape having a substantially circular transverse cross section, and is inserted into the insertion hole 425 and the through hole 411 in the front-rear direction. The locating shaft 50 protrudes and extends rearward from the back surface 41B of the cassette base 41. The locating shaft 50 is inserted into a later-described cylindrical guide body 38 (see FIG. 3) of the main body 3, and is locked in a state of being located at a predetermined position. The release button 56 is fixed to a front end portion of the locating shaft 50. The release button 56 protrudes forward from an opening in the upper portion of the front surface of the grip portion 421. A specific structure of the locating shaft 50 will be described later.

A structure of the main body 3 will be described. FIG. 4 illustrates the main body 3 in a state where the outer decorative plate 2 is removed. As shown in FIG. 4, the main body 3 includes a main body base 31, a cover portion 32, a supply roll bearing portion 33, a winding roll bearing portion 34, a bearing portion 35, a support shaft 36, the cylindrical guide body 38, the thermal head 39, a head driving unit 311, a mechanism driving unit 312, and the like. The main body base 31 is formed in a substantially rectangular shape in a front view, and a front surface 31A thereof faces the back surface 41B of the cassette base 41 in the state where the cassette 4 is mounted. The cover portion 32 is provided on a back surface side of the main body base 31, and is formed in a substantially rectangular parallelepiped box shape. The cover portion 32 surrounds and protects the mechanism driving unit 312 which will be described later and which is provided on the back surface side of the main body base 31.

The supply roll bearing portion 33 and the winding roll bearing portion 34 are provided at positions on the front surface 31A of the main body base 31 respectively corresponding to the supply roll shaft 43 and the winding roll shaft 44 of the cassette 4. The supply roll bearing portion 33 supports the supply roll shaft 43 in a state where a tip end of the supply roll shaft 43 abuts on the supply roll bearing portion 33, and transmits a rotational driving force to the supply roll shaft 43 so that a ribbon supply roll (not shown) can be wound therearound. The winding roll bearing portion 34 supports the winding roll shaft 44 in a state where a tip end of the winding roll shaft 44 abuts on the winding roll bearing portion 34, and transmits a rotational driving force to the winding roll shaft 44 so that a ribbon winding roll (not shown) can be wound therearound.

The bearing portion 35 is provided at a position on the front surface 31A of the main body base 31 corresponding to the guide roller 45 of the cassette 4. The bearing portion 35 rotatably supports the guide roller 45 by engaging with a tip end portion 45A of the guide roller 45. The support shaft 36 is provided at a position on the front surface 31A of the main body base 31 corresponding to the guide roller 46 of the cassette 4. The support shaft 36 is inserted into a central shaft hole of the guide roller 46 and rotatably supports the guide roller 46.

The cylindrical guide body 38 is provided in a central upper portion, between the supply roll bearing portion 33 and the winding roll bearing portion 34, of the front surface 31A, and is provided at a position corresponding to the locating shaft 50 of the cassette 4. The cylindrical guide body 38 is formed in a substantially cylindrical shape extending forward from the front surface 31A, and the locating shaft 50 can be inserted into the cylindrical guide body 38 from a front. The cylindrical guide body 38 includes a pair of guide grooves 380 in an upper portion and a lower portion. Each of the guide grooves 380 sequentially includes an inclined portion 381, a straight portion 382, and an engaged hole 383 from a front side to a rear side. The inclined portion 381 is formed in a linear shape in a plan view, and the linear shape is inclined toward a rear right side with respect to an axis from a front end of the cylindrical guide body 38. The straight portion 382 is formed in a linear shape extending rearward from a rear end of the inclined portion 381, and is shorter than the inclined portion 381. The engaged hole 383 is bent leftward from a rear end of the straight portion 382, and is formed in a substantially rectangular shape in a plan view. A width of the guide groove 380 may be any width as long as balls 57 and 58, which will be described later, of the locating shaft 50 can be guided.

The thermal head 39 includes a plurality of thermoelectric elements arranged in the front-rear direction. The head driving unit 311 is provided on a lower side of the front surface 31A, and supports the thermal head 39 such that the thermal head 39 can move in the left-right direction and the up-down direction. The mechanism driving unit 312 is provided on the back surface side of the main body base 31, and includes a plurality of actuators such as various motors. The mechanism driving unit 312 respectively drives the supply roll bearing portion 33, the winding roll bearing portion 34, the head driving unit 311, and the thermal head 39 based on control commands received from a controller (not shown). The controller may be provided in the printing device 1, or may be provided in a terminal (not shown) that is connected to the printing device 1 to be able to communicate with the printing device 1 in a wired or wireless manner.

Figure 6:
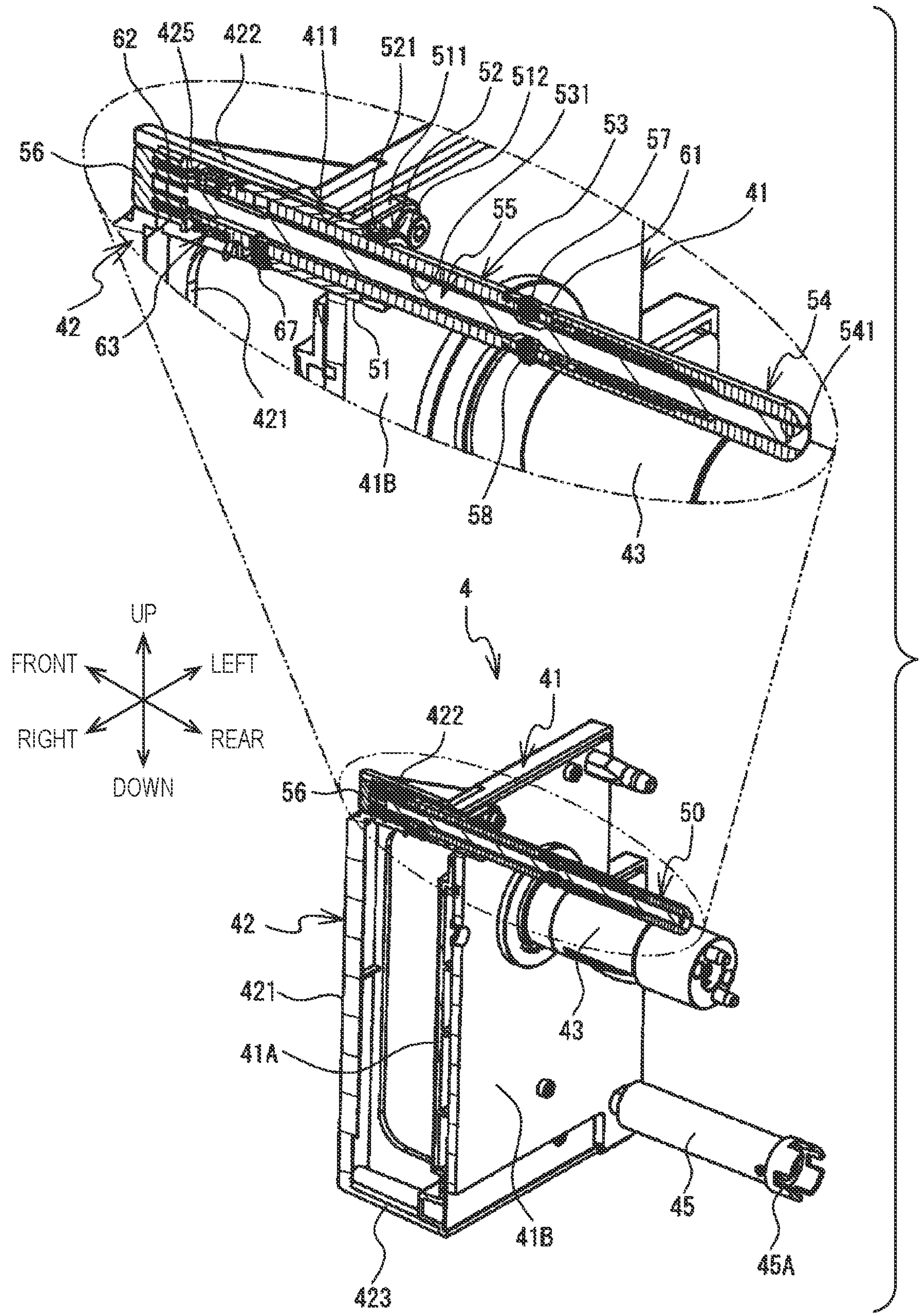
FIG. 6 is a cutaway and partially enlarged perspective view of the cassette 4.

The structure of the locating shaft 50 will be described with reference to FIGS. 6 to 8. The locating shaft 50 includes a holder 51, a guide shaft 53, a fixing ring 52, a cap 54, a center shaft 55, the release button 56, the balls 57 and 58, a cylindrical collar 61, a release spring 62, a lock spring 63, and the like. The holder 51, the guide shaft 53, the fixing ring 52, the cap 54, the release button 56, and the cylindrical collar 61 are each made of a resin, and the center shaft 55 and the balls 57 and 58 are each made of a metal, but materials are not limited to these material.

Figure 9:
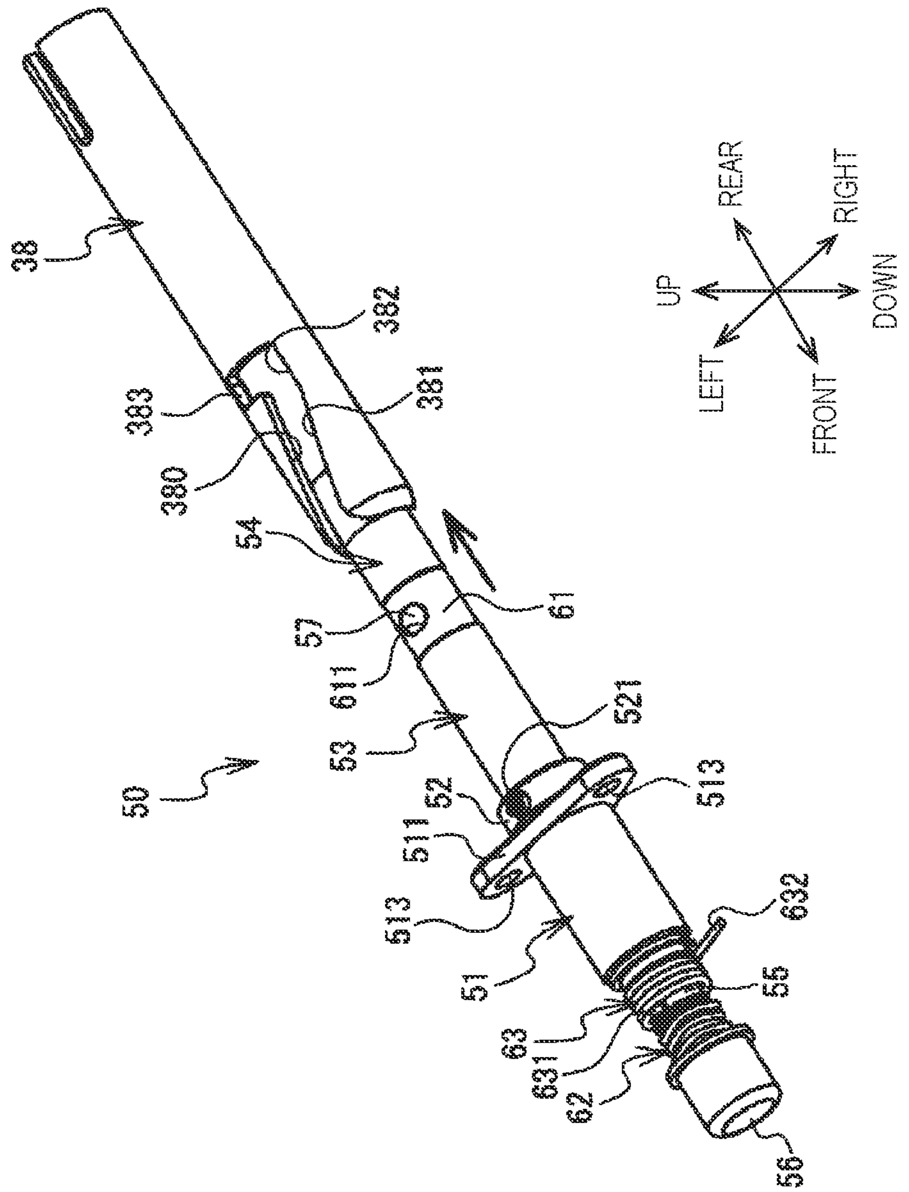
FIG. 9 is a perspective view showing a state where a tip end side of the locating shaft 50 is inserted into a cylindrical guide body 38.

The holder 51 is formed in a short axis cylindrical shape extending in the left-right direction. A fixing flange 511 is provided on a right side of an outer peripheral surface of the holder 51. The fixing flange 511 is formed in a substantially triangular shape in a right side view, and includes a pair of fixing holes 513 (see FIG. 9). A front surface of the fixing flange 511 abuts on the back surface 41B of the cassette base 41. The fixing flange 511 is fixed to the back surface 41B of the cassette base 41 by two screws 512 through the pair of fixing holes 513.

The guide shaft 53 is formed in a long axis cylindrical shape extending in the front-rear direction, and is coaxially inserted and disposed inside the holder 51. The guide shaft 53 includes a guide hole 531 therein. The guide hole 531 extends in the front-rear direction. The guide shaft 53 protrudes and extends rearward from a rear end portion of the holder 51. A diameter-reduced portion 532 whose diameter is reduced toward an inner side in a radial direction is provided on an outer peripheral surface of the guide shaft 53 on a front end side. A locking ring 65 is fixed to a position on an outer peripheral surface of the guide shaft 53 close to a rear side of the diameter-reduced portion 532. The locking ring 65 protrudes from the outer peripheral surface of the guide shaft 53 toward an outer side in the radial direction. The locking ring 65 abuts on an upper portion of a front end portion of the holder 51 from a front.

A through hole 533 is provided on the outer peripheral surface of the guide shaft 53 behind the locking ring 65. The through hole 533 penetrates the guide shaft 53 in the up-down direction orthogonal to a length direction of the guide shaft 53. A substantially columnar pin 67 is attachably and detachably inserted into and fixed to the through hole 533 from a lower portion. A stepped portion 536 is provided to be closer to a rear end side than a central portion of the guide shaft 53 in the length direction. The stepped portion 536 has a substantially cylindrical shape having a diameter reduced toward the inner side in the radial direction and having a predetermined length. A pair of upper and lower holes 534 and 535 are provided in the stepped portion 536. The holes 534 and 535 are round holes and penetrate in the up-down direction. A diameter of each of the holes 534 and 535 may be any diameter as long as a respective one of the balls 57 and 58 to be described later can be inserted therethrough in the up-down direction.

The fixing ring 52 has substantially the same diameter as that of the holder 51, and is formed in a short axis cylindrical shape extending in the left-right direction. The fixing ring 52 is mounted on an outer side of the guide shaft 53, and is fixed to the guide shaft 53 by a fixing screw 521 in a state of abutting on the rear end portion of the holder 51. As a result, the fixing ring 52 is integrated with the guide shaft 53. The fixing ring 52 restricts forward movement of the guide shaft 53 by abutting on the rear end portion of the holder 51. The locking ring 65 restricts rearward movement of the guide shaft 53 by abutting on the front end portion of the holder 51. Therefore, the guide shaft 53 is located in the front-rear direction with respect to the holder 51.

The cap 54 is formed in a substantially cylindrical shape extending in the front-rear direction. The cap 54 includes a guide hole 541 therein. The cap 54 is coaxially mounted to the rear end side of the guide shaft 53. As a result, the guide hole 541 and the guide hole 531 of the guide shaft 53 coaxially communicate with each other.

The center shaft 55 is formed in a rod shape extending in the front-rear direction. The center shaft 55 is coaxially inserted and disposed inside the guide hole 531 of the guide shaft 53 and the guide hole 541 of the cap 54, and is supported to be movable along the length direction of the guide shaft 53 and the cap 54. A front end side of the center shaft 55 protrudes forward from the diameter-reduced portion 532 of the guide shaft 53. A button fixing portion 551 is provided at a front end portion of the center shaft 55. A recessed portion 552 whose diameter is reduced toward an inner side in the radial direction is provided on an outer peripheral surface of a substantially central portion of the center shaft 55 in the front-rear direction.

The release button 56 is formed in a substantially columnar shape having a short axis and extending in the front-rear direction, and is fixed to the button fixing portion 551. A substantially ring-shaped groove portion 561 recessed forward is provided in a rear end surface of the release button 56.

The balls 57 and 58 are disposed inside the holes 534 and 535 of the guide shaft 53, respectively. The balls 57 and 58 are in contact with an outer peripheral surface of the center shaft 55 in the guide hole 531 of the guide shaft 53, and slide on the outer peripheral surface of the center shaft 55 as the center shaft 55 moves.

The cylindrical collar 61 is formed in a short axis cylindrical shape extending in the front-rear direction, and is mounted on an outer peripheral surface of the stepped portion 536 of the guide shaft 53. The cylindrical collar 61 is provided with a pair of upper and lower exposure holes 611 and 612. The exposure holes 611 and 612 are provided at positions corresponding to the pair of upper and lower holes 534 and 535 of the guide shaft 53. A diameter of each of the exposure holes 611 and 612 is smaller than the diameter of a respective one of the balls 57 and 58. As a result, the cylindrical collar 61 can allow a part of each of the balls 57 and 58 to protrude outward from a respective one of the exposure holes 611 and 612, and can prevent the balls 57 and 58 from falling out of the exposure holes 611 and 612 respectively.

The release spring 62 is a cylindrical compression coil spring extending in the front-rear direction, and is a push-back spring that performs pushing back in a reverse direction of an axial direction when a load is applied in the axial direction. The release spring 62 is mounted on the front end side of the center shaft 55. A front end portion of the release spring 62 is inserted into the groove portion 561 of the release button 56 from a rear side, and abuts against a wall surface of the groove portion 561 on a back side. A rear end portion of the release spring 62 abuts against a front end portion of the guide shaft 53. As a result, when the release button 56 is pressed rearward, the release spring 62 acts to push back the release button 56 forward in accordance with a pressing load.

The lock spring 63 is a torsion coil spring, and is mounted on an outer peripheral surface of the diameter-reduced portion 532 on the front end side of the guide shaft 53. One end portion 631 of the lock spring 63 on a front end side is fixed to the diameter-reduced portion 532 of the guide shaft 53. The other end portion 632 of the lock spring 63 on a rear end side is locked to a locked portion (not shown) provided on an inner peripheral surface of the insertion hole 425 in the upper support portion 422 of the handle 42. The lock spring 63 is wound in a clockwise direction (clockwise) about an axis when viewed from the front end side. Therefore, when each of the guide shaft 53 and the cap 54 rotates in the clockwise direction (clockwise) about an axis with respect to the holder 51 when viewed from a front end side, since the lock spring 63 is wound up in the same direction as a winding direction, the lock spring 63 acts in a direction of pushing back each of the guide shaft 53 and the cap 54 in a counterclockwise direction (counterclockwise) about the center shaft 55 when viewed from the front end side.

Switching between a first state and a second state of the locating shaft 50 will be described with reference to FIGS. 7 and 8. The locating shaft 50 can be displaced between the first state and the second state by an operation of the release button 56. The locating shaft 50 shown in FIG. 7 is in the first state. In the first state, the release spring 62 biases the release button 56 forward. As a result, inside the guide hole 531 of the guide shaft 53, the center shaft 55 moves forward integrally with the release button 56. At this time, a portion of the outer peripheral surface of the center shaft 55 behind the recessed portion 552 is located at positions of the balls 57 and 58. Therefore, the balls 57 and 58 are pushed toward an outer side in the radial direction by the outer peripheral surface of the center shaft 55, and a part of each of the balls 57 and 58 protrudes from a respective one of the exposure holes 611 and 612.

Figure 7:
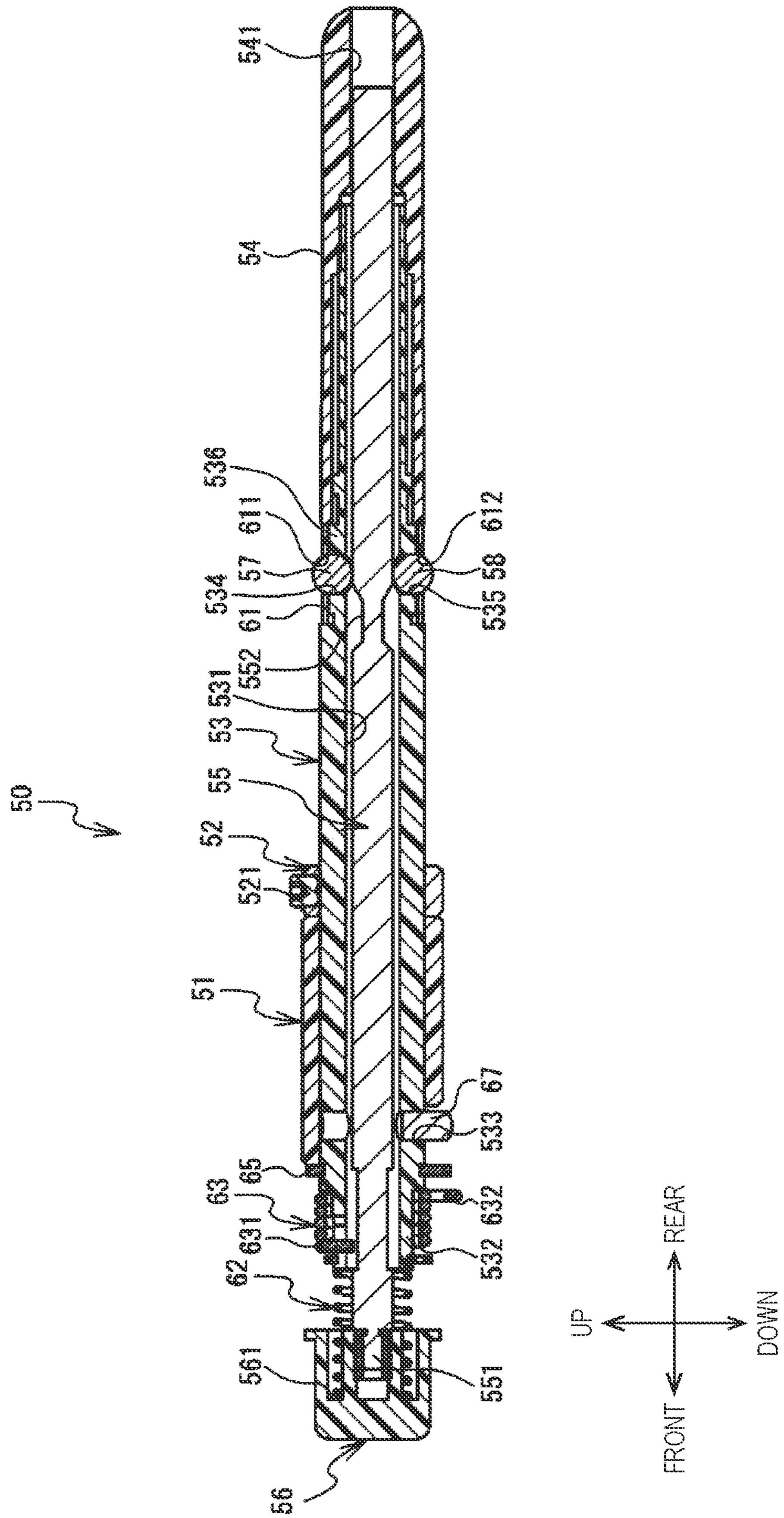
FIG. 7 is a cross-sectional view (first state) of a locating shaft 50.
Figure 8:
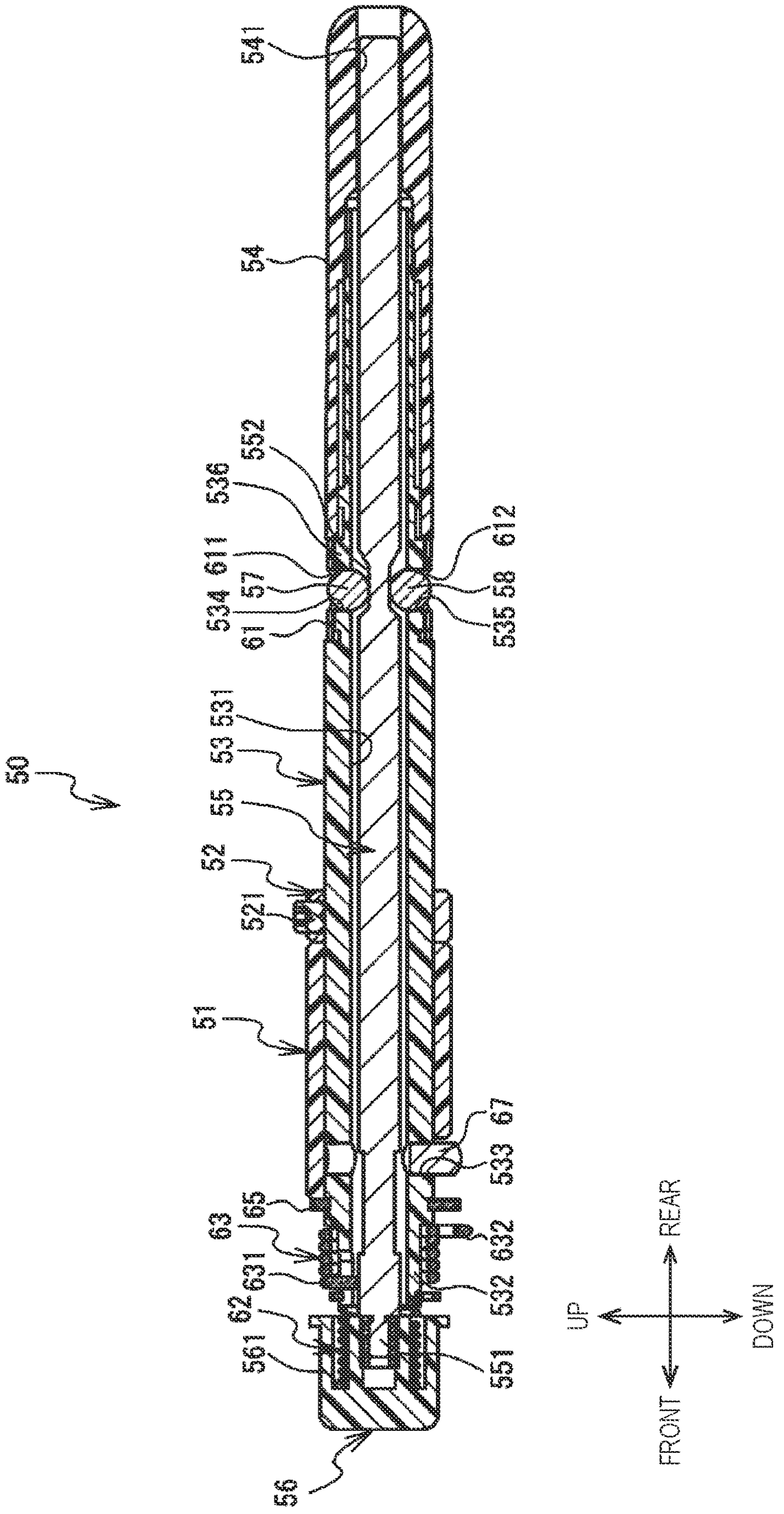
FIG. 8 is a cross-sectional view (second state) of the locating shaft 50.

In the first state shown in FIG. 7, when the release button 56 is pushed rearward against a spring force of the release spring 62, the center shaft 55 moves rearward inside the guide hole 531 of the guide shaft 53. At this time, the balls 57 and 58 slide on the outer peripheral surface of the guide shaft 53, and face a position of the recessed portion 552 of the center shaft 55. Therefore, since the balls 57 and 58 are movable inward in the radial direction, the balls 57 and 58 respectively move inward from the exposure holes 611 and 612 by being pushed in from an outside, so that the locating shaft 50 is switched to the second state.

A method for inserting the locating shaft 50 into the cylindrical guide body 38 and locking the locating shaft 50 will be described. In order to mount the cassette 4 to the main body 3, the user grips the handle 42 of the cassette 4 and disposes the cassette 4 on a front side of the main body 3. The back surface 41B of the cassette base 41 of the cassette 4 faces the front surface 31A of the main body base 31 of the main body 3. The locating shaft 50 on a side of the back surface 41B faces the cylindrical guide body 38 on a side of the front surface 31A.

As shown in FIG. 2, the user inserts a tip end side of the locating shaft 50 into the cylindrical guide body 38. Since the locating shaft 50 is in the first state, a part of the ball 57 protrudes upward from the upper exposure hole 611, and a part of the ball 58 protrudes downward from the lower exposure hole 612. The user inserts a part of the ball 57 protruding from the upper exposure hole 611 into a front end side of the upper guide groove 380 of the cylindrical guide body 38. At the same time, the user inserts a part of the ball 58 protruding from the lower exposure hole 612 into a front end side of the lower guide groove 380 of the cylindrical guide body 38.

Figure 10:
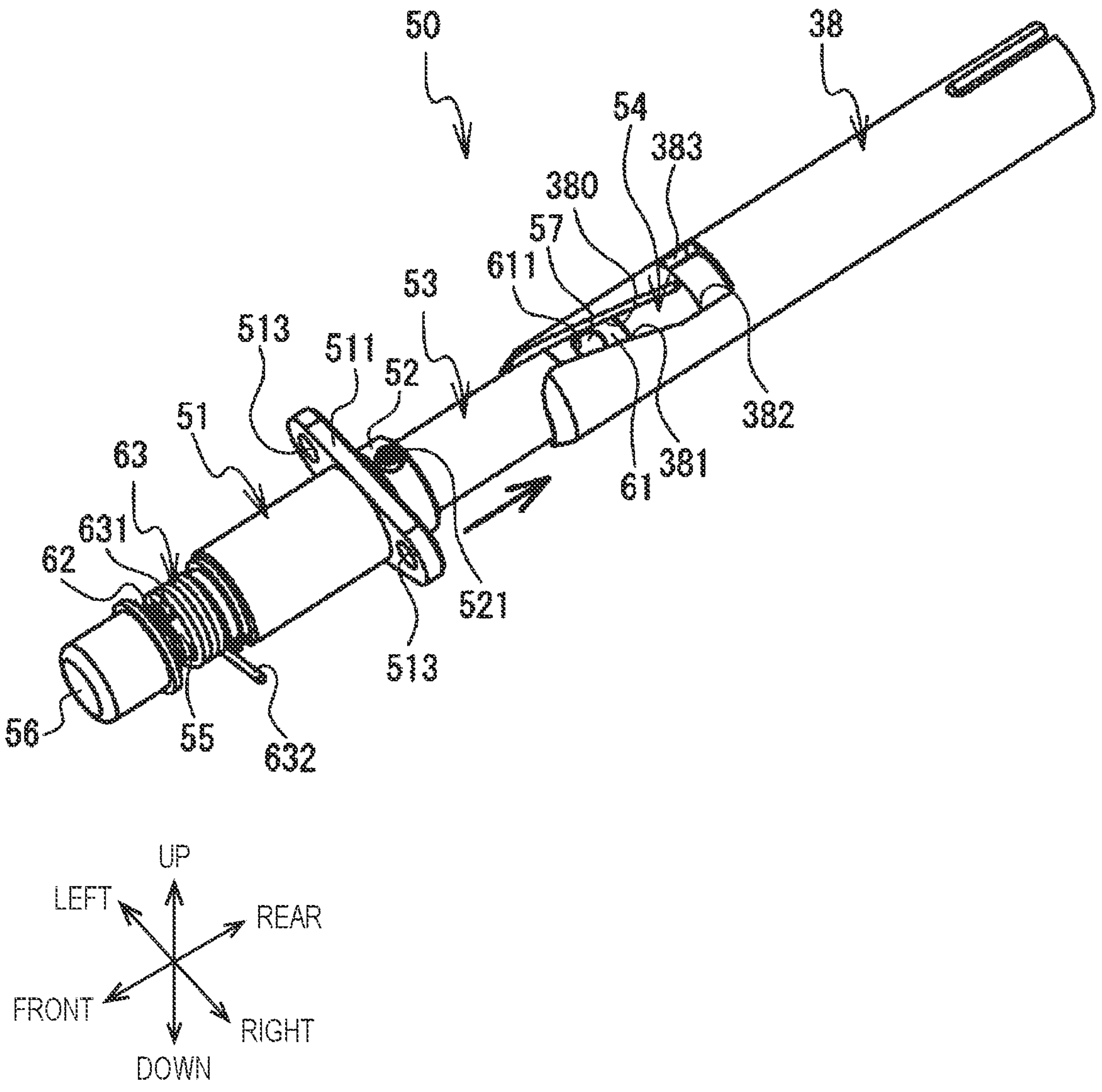
FIG. 10 is a perspective view showing a state where the locating shaft 50 is further inserted into the cylindrical guide body 38 from the state in FIG. 9.
Figure 11:
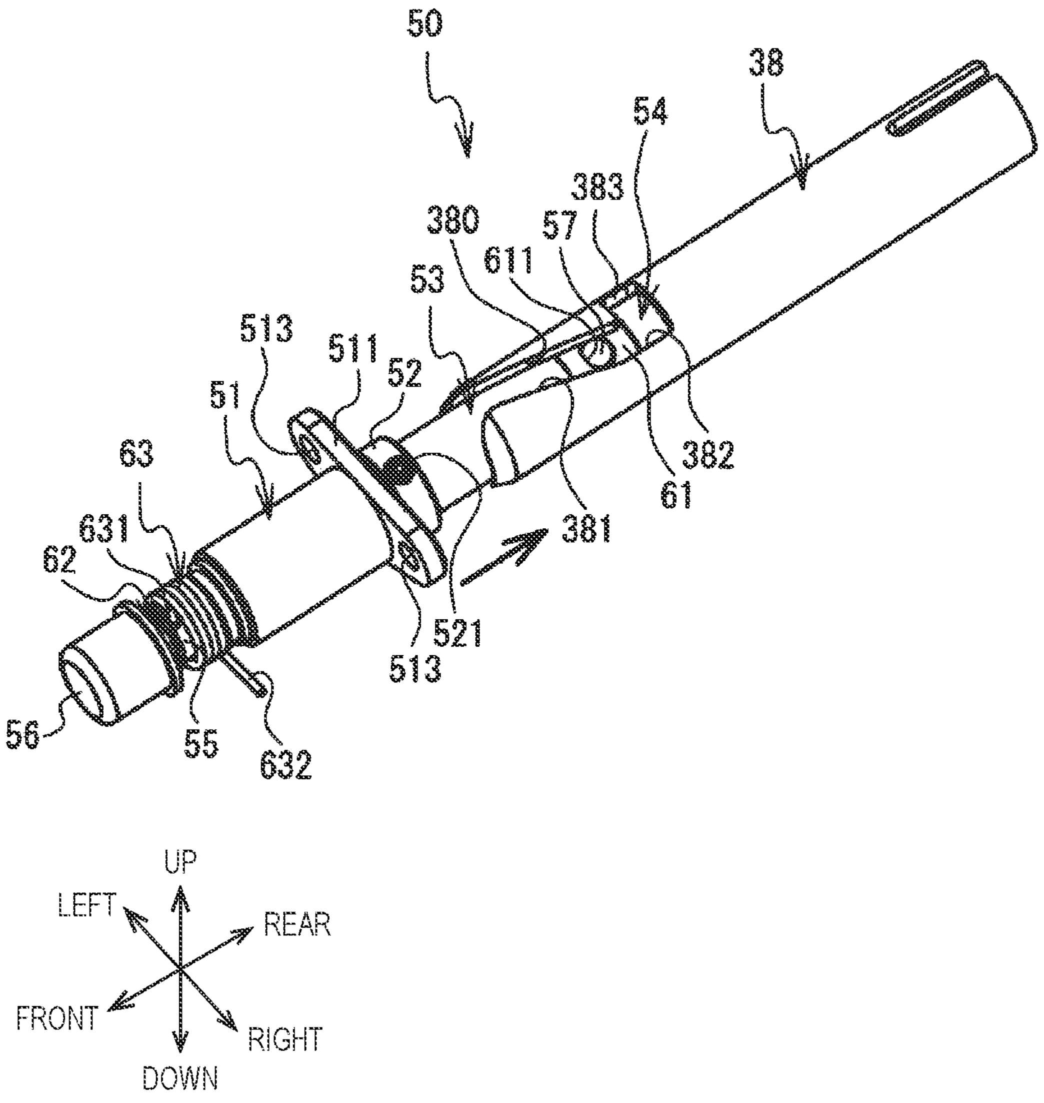
FIG. 11 is a perspective view showing a state where the locating shaft 50 is further inserted into the cylindrical guide body 38 from the state in FIG. 10.

The user moves the cassette 4 toward a side of the main body 3 in a state of gripping the handle 42. As shown in FIGS. 10 and 11, as the locating shaft 50 is pushed toward a back side of the cylindrical guide body 38, each of the balls 57 and 58 moves along the inclined portion 381 of the guide groove 380. Each of the balls 57 and 58 moves along the inclined portion 381, so that each of the balls 57 and 58 rotates in the clockwise direction (clockwise) about the center shaft 55 when viewed from a front end side. Accordingly, the guide shaft 53 and the cap 54 rotate in the clockwise direction (clockwise) about the center shaft 55 integrally with the balls 57 and 58 against a spring force of the lock spring 63 when viewed from the front end side.

Figure 12:
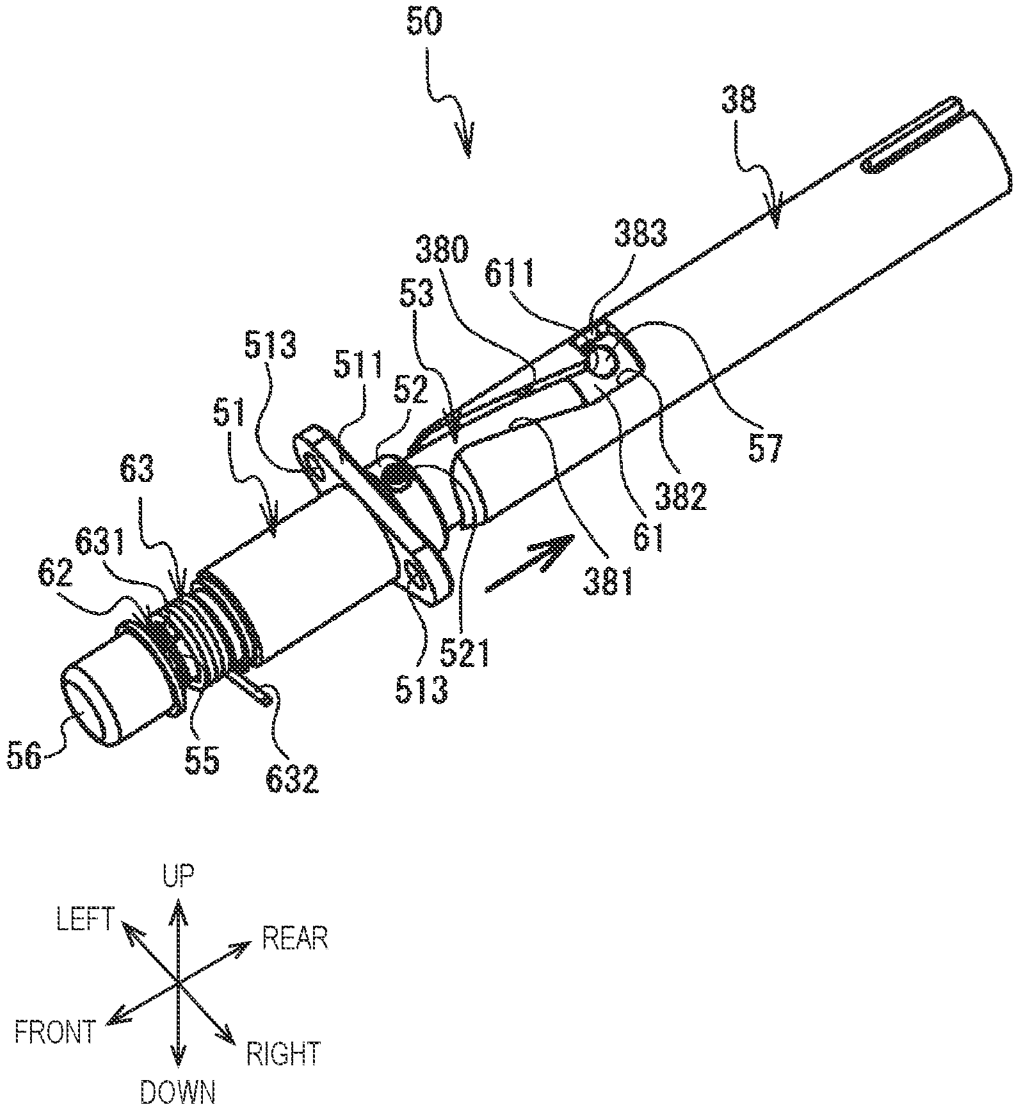
FIG. 12 is a perspective view showing a state where the locating shaft 50 is further inserted into the cylindrical guide body 38 from the state in FIG. 11.
Figure 13:
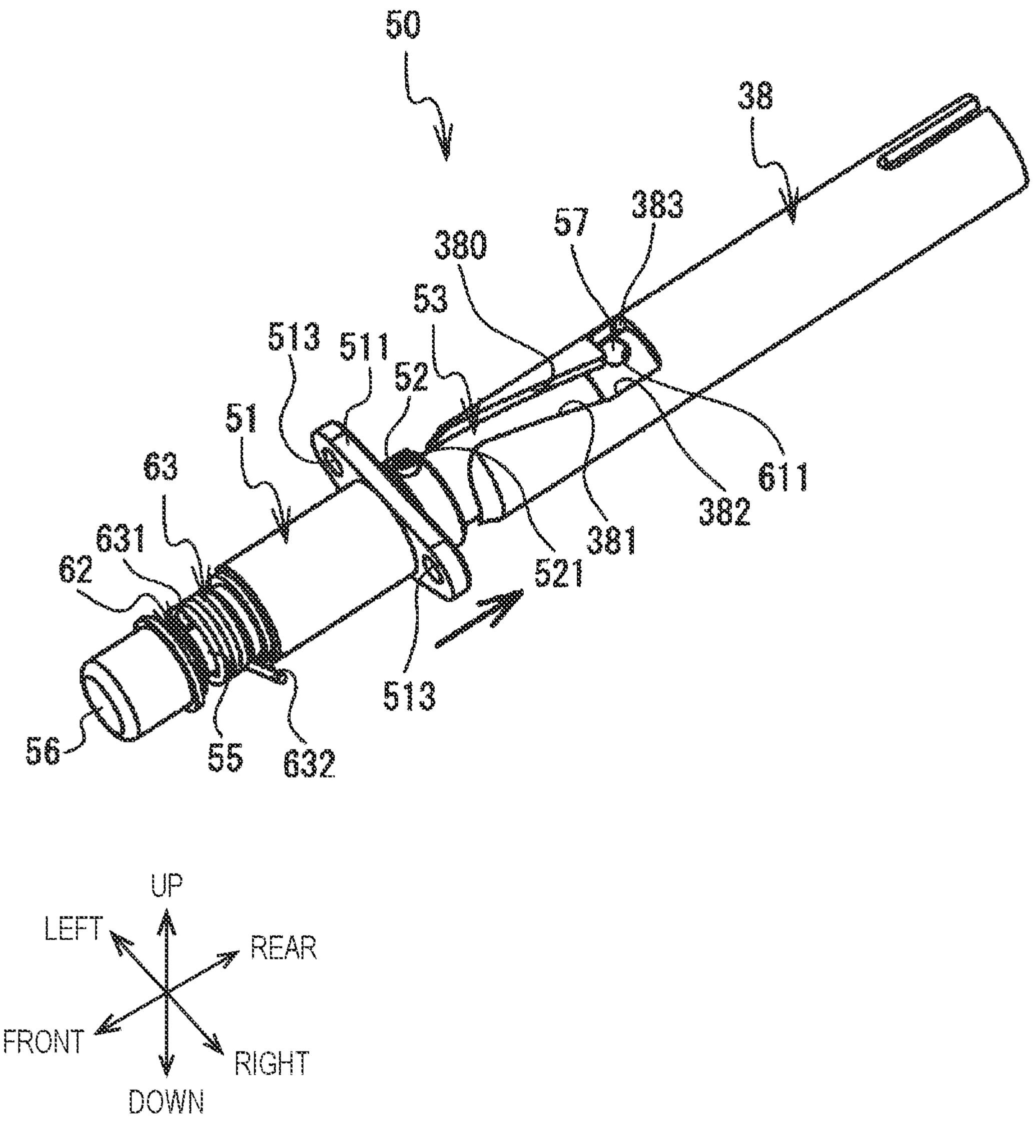
FIG. 13 is a perspective view showing a state where the locating shaft 50 is locked to the cylindrical guide body 38.

As shown in FIG. 12, when each of the balls 57 and 58 moves from the inclined portion 381 along the straight portion 382, rotation of the guide shaft 53 and the cap 54 is stopped. When each of the balls 57 and 58 abuts against a rearmost end of the guide groove 380 from the straight portion 382, rearward movement of the locating shaft 50 is restricted, so that the locating shaft 50 is located at the predetermined position with respect to the cylindrical guide body 38. Due to the spring force of the lock spring 63, the guide shaft 53 and the cap 54 are pushed back by rotating in the counterclockwise direction (counterclockwise) about the center shaft 55 when viewed from the front end side, and each of the balls 57 and 58 engages with the engaged hole 383 (see FIG. 13). As a result, the locating shaft 50 is in a locked state of being locked to the cylindrical guide body 38, and the cassette 4 is mounted to the main body 3.

As described above, in the printing device 1, guiding and locking of the locating shaft 50 can be simultaneously performed by only one action of inserting the locating shaft 50 into the cylindrical guide body 38, so that operability can be improved. By disengaging each of the balls 57 and 58 from the engaged hole 383, the locked state can be easily released.

A method for releasing the locking of the locating shaft 50 to pull out the locating shaft 50 from the cylindrical guide body 38 will be described. In a state shown in FIG. 1, the user presses down the release button 56 with a thumb of a hand with which the handle 42 is gripped while gripping the handle 42 of the cassette 4. Then, the center shaft 55 is pushed rearward, so that a positional relationship between the recessed portion 552 and the balls 57 and 58 changes, and the locating shaft 50 changes from the first state (see FIG. 7) to the second state (see FIG. 8). The user pulls out the locating shaft 50 from the cylindrical guide body 38 by pulling the handle 42 forward. At this time, since each of the balls 57 and 58 is pushed into an inside of the guide shaft 53 by an inner edge portion of a respective one of the exposure holes 611 and 612, the locking to the cylindrical guide body 38 is released. As a result, the user can easily pull out the locating shaft 50 from the cylindrical guide body 38 (see FIG. 2), and can easily remove the cassette 4 from the main body 3.

As described above, the printing device 1 according to the present embodiment includes the main body 3 and the cassette 4. The front surface 31A of the main body 3 supports the thermal head 39. The cassette 4 includes the plate-shaped cassette base 41, the supply roll shaft 43, and the winding roll shaft 44. The supply roll shaft 43 is provided on a left side of the back surface 41B of the cassette base 41 facing the front surface 31A, and rotatably supports the ribbon supply roll (not shown). The winding roll shaft 44 is provided on a right side of the back surface 41B, and rotatably supports the ribbon winding roll (not shown). The cassette 4 is attached to and detached from the front surface 31A of the main body 3 along the axis direction of the supply roll shaft 43 and the winding roll shaft 44. The printing device 1 performs printing by transferring ink of the ink ribbon onto a print medium duet to heating of the thermal head 39, and the ink ribbon is fed out from the ribbon supply roll and wound around the ribbon winding roll through the thermal head 39.

The printing device 1 further includes the locating shaft 50, the cylindrical guide body 38, the balls 57 and 58, the center shaft 55, and the release button 56. The locating shaft 50 is provided in the back surface 41B of the cassette base 41 of the cassette 4. The cylindrical guide body 38 is provided at the position on the front surface 31A of the main body 3 facing the locating shaft 50, and guides and locates the locating shaft 50 to the predetermined position on the side of the front surface 31A along the axis direction. The balls 57 and 58 are provided in the locating shaft 50, and locks the locating shaft 50 to the cylindrical guide body 38 in a state where the locating shaft 50 is located at the predetermined position by the cylindrical guide body 38. The release button 56 is pressed down by the user to release the locking. When the release button 56 is pressed down, the center shaft 55 is pushed in, the balls 57 and 58 can retract, and the locking is released.

As described above, in the printing device 1, the balls 57 and 58 are provided in the cylindrical guide body 38 provided in the front surface 31A of the main body 3, so that a limited space in the printing device 1 can be effectively used. Since the locating shaft 50 can be locked to the cylindrical guide body 38 in a state where the locating shaft 50 is guided and located to the predetermined position by the cylindrical guide body 38, usability can be improved.

The locating shaft 50 is provided in the central upper portion, between the supply roll shaft 43 and the winding roll shaft 44, of the back surface 41B of the cassette base 41. Therefore, the cassette base 41 is supported in a balanced manner in the left-right direction with respect to the front surface 31A of the main body 3. A space between the supply roll shaft 43 and the winding roll shaft 44 is limited by a thickness of each of the ribbon supply roll and the ribbon winding roll, but the limited space in the printing device 1 can be more effectively used by providing the locating shaft 50 in a dead space above the supply roll shaft 43 and the winding roll shaft 44.

The cassette 4 includes the handle 42. The handle 42 is provided on the front surface 41A of the cassette base 41, and can be gripped by the user. Since the release button 56 is provided in the handle 42, a release operation for the locking can be easily performed.

In the above description, the locating shaft 50 is an example of a "shaft" in the present disclosure. The exposure holes 611 and 612 are examples of an "opening portion" in the present disclosure. The balls 57 and 58 are examples of a "spherical body" in the present disclosure. The release spring 62 is an example of a "first biasing member" in the present disclosure, and the lock spring 63 is an example of a "second biasing member" in the present disclosure. The release button 56 is an example of an "operation unit" in the present disclosure. The front surface 31A of the main body base 31 of the main body 3 is an example of a "head support surface" in the present disclosure. The back surface 41B of the cassette base 41 of the cassette 4 is an example of a "facing surface" in the present disclosure.

Various modifications can be made to the present disclosure in addition to the above embodiment. For example, the printing device 1 according to the above embodiment performs printing by allowing the packaging material to pass through the lower portion from the left to the right, but may perform printing by allowing the packaging material to pass through the lower portion from the left to the right. A configuration of the head driving unit 311 for the thermal head 39 can also be freely changed.

The locating shaft 50 is provided in the central upper portion, between the supply roll shaft 43 and the winding roll shaft 44, of the back surface 41B of the cassette base 41, but depending on positions of the thermal head 39 and the head driving unit 311, the locating shaft 50 may be provided in a dead space formed in a vicinity of a center or in a central lower portion of the back surface 31B. The position of the cylindrical guide body 38 may be changed accordingly. Furthermore, a position of the release button 56 provided in the handle 42 may also be changed depending on the position of the locating shaft 50. Instead of the release button 56, the operation unit may release locking by changing a state of the center shaft 55 by a lever or a trigger disposed on a back surface of the handle 42.

In the locating shaft 50, the balls 57 and 58 are provided on a top and a bottom of the outer peripheral surface of the guide shaft 53 to be able to protrude and retract, but the number of balls may be one, or may be two or more. The positions of the balls 57 and 58 may be positions other than the top and the bottom of the outer peripheral surface of the guide shaft 53.

When the locating shaft 50 is inserted into the cylindrical guide body 38, in accordance with a shape of the guide groove 380 of the cylindrical guide body 38, each of the guide shaft 53 and the cap 54 rotates in the clockwise direction about the center shaft 55 when viewed from the front end side, but the shape of the guide groove 380 may be reversed and each of the guide shaft 53 and the cap 54 may rotate in the counterclockwise direction about the center shaft 55 when viewed from the front end side. In this case, the lock spring 63 having an opposite winding direction may be used.

In the above embodiment, the cylindrical collar 61 is mounted on the stepped portion 536 of the guide shaft 53, and each of the balls 57 and 58 is partially exposed to the outside while being prevented from falling out by a respective one of the exposure holes 611 and 612 provided in the cylindrical collar 61, but each of the balls 57 and 58 may be partially exposed to the outside while the balls 57 and 58 may be prevented from falling out, for example, by omitting the cylindrical collar 61 and reducing the diameter of each of the holes 534 and 535.

In the above embodiment, the cap 54 is coaxially mounted to a rear end portion of the guide shaft 53, but a guide shaft in which the guide shaft 53 is integrated with the cap 54 may be used.

Hereinafter, a second embodiment of the present disclosure will be described with reference to FIGS. 14 to 16. Since the same reference numerals in the drawings denote the same configurations as those in the above embodiment unless there is any additional description, detailed descriptions thereof will be omitted. In the second embodiment, a locating shaft 500 and a cylindrical guide body 138 are used instead of the locating shaft 50 and the cylindrical guide body 38.

A structure of the locating shaft 500 will be described. The locating shaft 500 includes the holder 51, the guide shaft 53, the fixing ring 52, the cap 54, a center shaft 550, the release button 56, the balls 57 and 58, and the cylindrical collar 61. On the other hand, unlike the locating shaft 50 in the above embodiment, the locating shaft 500 does not include the release spring 62 and the lock spring 63.

The center shaft 550 is formed in a rod shape extending in a front-rear direction. The center shaft 550 includes a first shaft 5501 and a second shaft 5502 arranged side by side in the front-rear direction, and a compression spring 5503 that connects the two shafts 5501 and 5502. The center shaft 550 is coaxially inserted and disposed inside the guide hole 531 of the guide shaft 53 and the guide hole 541 of the cap 54, and is supported to be movable along a length direction of the guide shaft 53 and the cap 54. A front end side of the center shaft 550 (first shaft 5501) protrudes forward from the diameter-reduced portion 532 of the guide shaft 53. The button fixing portion 551 is provided at a front end portion of the center shaft 550 (first shaft 5501). The recessed portion 552 whose diameter is reduced toward an inner side in a radial direction is provided on an outer peripheral surface of a substantially central portion of the center shaft 550 (first shaft 5501) in the front-rear direction. A biasing spring 5504 is provided which includes one end connected to the first shaft 5501 and the other end connected to the cap 54 and which biases the first shaft 5501 rearward. A spring force (spring constant) of the biasing spring 5504 is set to be smaller than a spring force (spring constant) of the compression spring 5503.

The balls 57 and 58 are disposed inside the holes 534 and 535 of the guide shaft 53, respectively. The balls 57 and 58 are in contact with an outer peripheral surface of the center shaft 550 (first shaft 5501) in the guide hole 531 of the guide shaft 53, and slide on the outer peripheral surface of the center shaft 550 (first shaft 5501) as the center shaft 550 (first shaft 5501) moves.

The cylindrical collar 61 is formed in the short axis cylindrical shape extending in the front-rear direction, and is mounted on the outer peripheral surface of the stepped portion 536 of the guide shaft 53 similarly to the above embodiment. The cylindrical collar 61 is provided with a pair of upper and lower exposure holes 611 and 612. As a result, the cylindrical collar 61 can allow a part of each of the balls 57 and 58 to protrude outward from a respective one of the exposure holes 611 and 612, and can prevent the balls 57 and 58 from falling out of the exposure holes 611 and 612 respectively.

In the locating shaft 500, a position of each of the guide shaft 53 and the cap 54 centered on the axis is fixed with respect to the holder 51, and the guide shaft 53 and the cap 54 are attached not to be rotatable.

The cylindrical guide body 138 is formed in a substantially cylindrical shape extending forward from the front surface 31A, and the locating shaft 500 can be inserted into the cylindrical guide body 138 from a front. The cylindrical guide body 138 includes the pair of engaged holes 383 and an abutment portion 384. Each of the engaged holes 383 is formed in a circular shape in a plan view. The abutment portion 384 is provided inside the cylindrical guide body 138, and is disposed, in the front-rear direction, at a position where a rear end of the cap 54 of the locating shaft 500 abuts on the abutment portion 384 in the state where the cassette 4 is mounted to the main body 3. In a mounted state, the pair of engaged holes 384 are disposed at positions facing the exposure holes 611 and 612.

Switching of a state of the locating shaft 500, and a method for inserting the locating shaft 500 into the cylindrical guide body 138 and locking the locating shaft 500 will be described with reference to FIGS. 14 to 16. The locating shaft 500 shown in FIG. 14 is in an initial state before the cassette 4 is mounted to the main body 3. In the initial state, the release button 56 is in a state of being pushed rearward, and inside the guide hole 531 of the guide shaft 53, the center shaft 550 is biased by the biasing spring 5504 to move rearward integrally with the release button 56. At this time, the positions of the balls 57 and 58 face the recessed portion 552 of the outer peripheral surface of the center shaft 550 (first shaft 5501). Therefore, since the balls 57 and 58 are movable inward in the radial direction, the balls 57 and 58 respectively move inward from the exposure holes 611 and 612 by being pushed in from the outside. At this time, the second shaft 5502 is pushed rearward by the compression spring 5503, and a rear end portion of the second shaft 5502 is in a state of being exposed and protruding from a guide hole of the cap 54.

Similarly to the above embodiment, in the second embodiment, a user grips the handle 42 of the cassette 4 and disposes the cassette 4 on the front side of the main body 3 in order to mount the cassette 4 to the main body 3. The back surface 41B of the cassette base 41 of the cassette 4 faces the front surface 31A of the main body base 31 of the main body 3. The locating shaft 500 on the side of the back surface 41B faces the cylindrical guide body 138 on the side of the front surface 31A.

Figure 14:
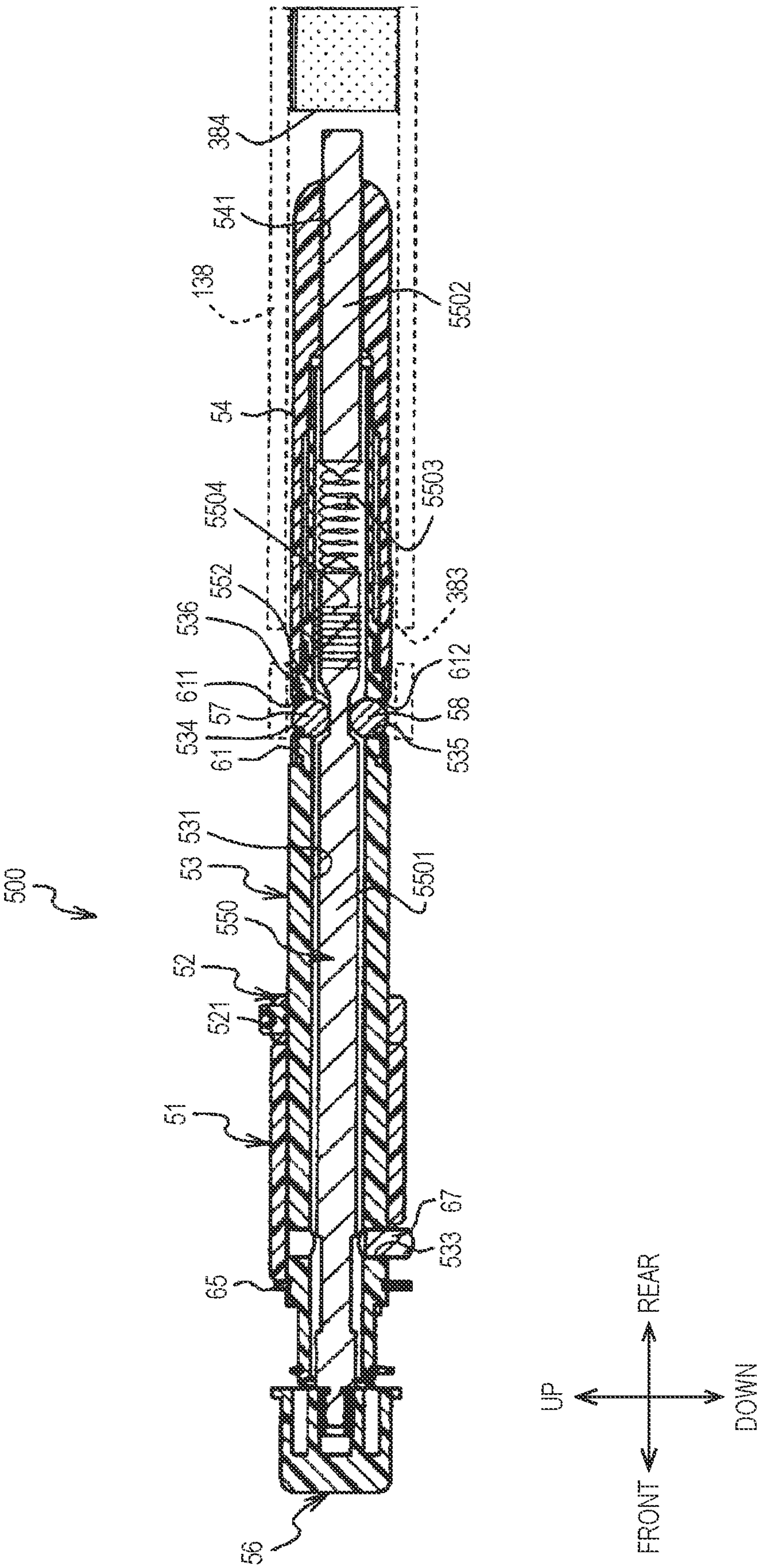
FIG. 14 is a cross-sectional view showing a state where a locating shaft 50 is inserted into a cylindrical guide body 38.

As shown in FIG. 14, the user inserts a tip end side of the locating shaft 500 into the cylindrical guide body 138. Since the locating shaft 500 is in the initial state, the balls 57 and 58 do not respectively protrude outward from the exposure holes 611 and 612, and do not interfere with an inner wall of the cylindrical guide body 138. Therefore, the user can smoothly insert the locating shaft 500 into the cylindrical guide body 138 without feeling a resistance.

The user moves the cassette 4 toward a side of the main body 3 in a state of gripping the handle 42. As the locating shaft 500 is pushed toward a back side of the cylindrical guide body 138, a rear end of the second shaft 5502 abuts on the abutment portion 384, and the second shaft 5502 moves forward with respect to the cap 54. When the second shaft 5502 moves forward, due to a biasing force of the compression spring 5503, the first shaft 5501 also receives a force to move forward.

The center shaft 550 attempts to move forward, so that the balls 57 and 58 abut against a portion of the outer peripheral surface of the center shaft 550 (first shaft 5501) behind the recessed portion 552. Therefore, the balls 57 and 58 are pushed toward an outer side in the radial direction by the outer peripheral surface of the center shaft 550 (first shaft 5501), and a part of each of the balls 57 and 58 attempts to protrude from a respective one of the exposure holes 611 and 612. However, in the middle of insertion, each of the balls 57 and 58 cannot completely protrude due to interfering with the inner wall of the guide cylinder 138.

Figure 15:
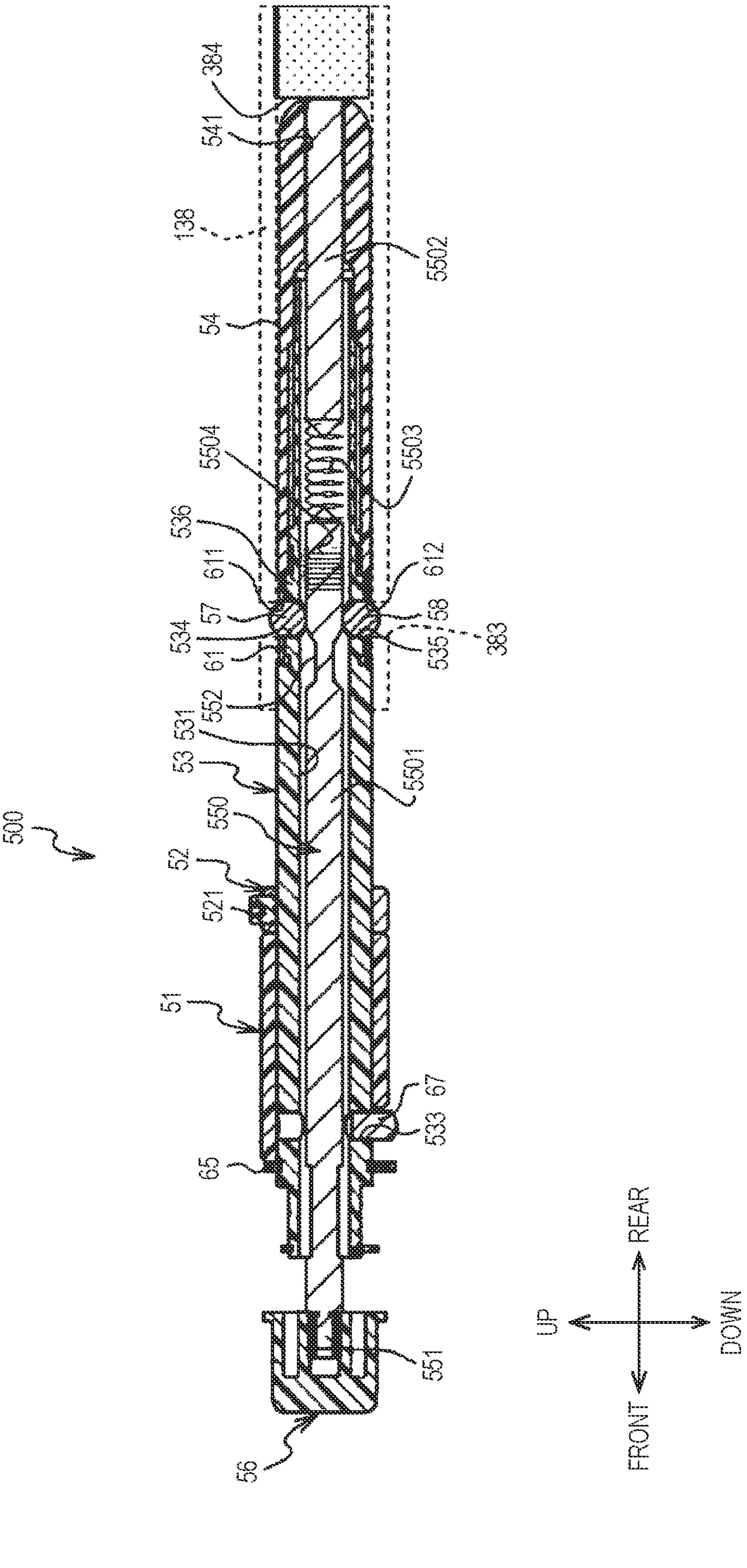
FIG. 15 is a cross-sectional view showing a state where the locating shaft 50 is locked to the cylindrical guide body 38.
Figure 16:
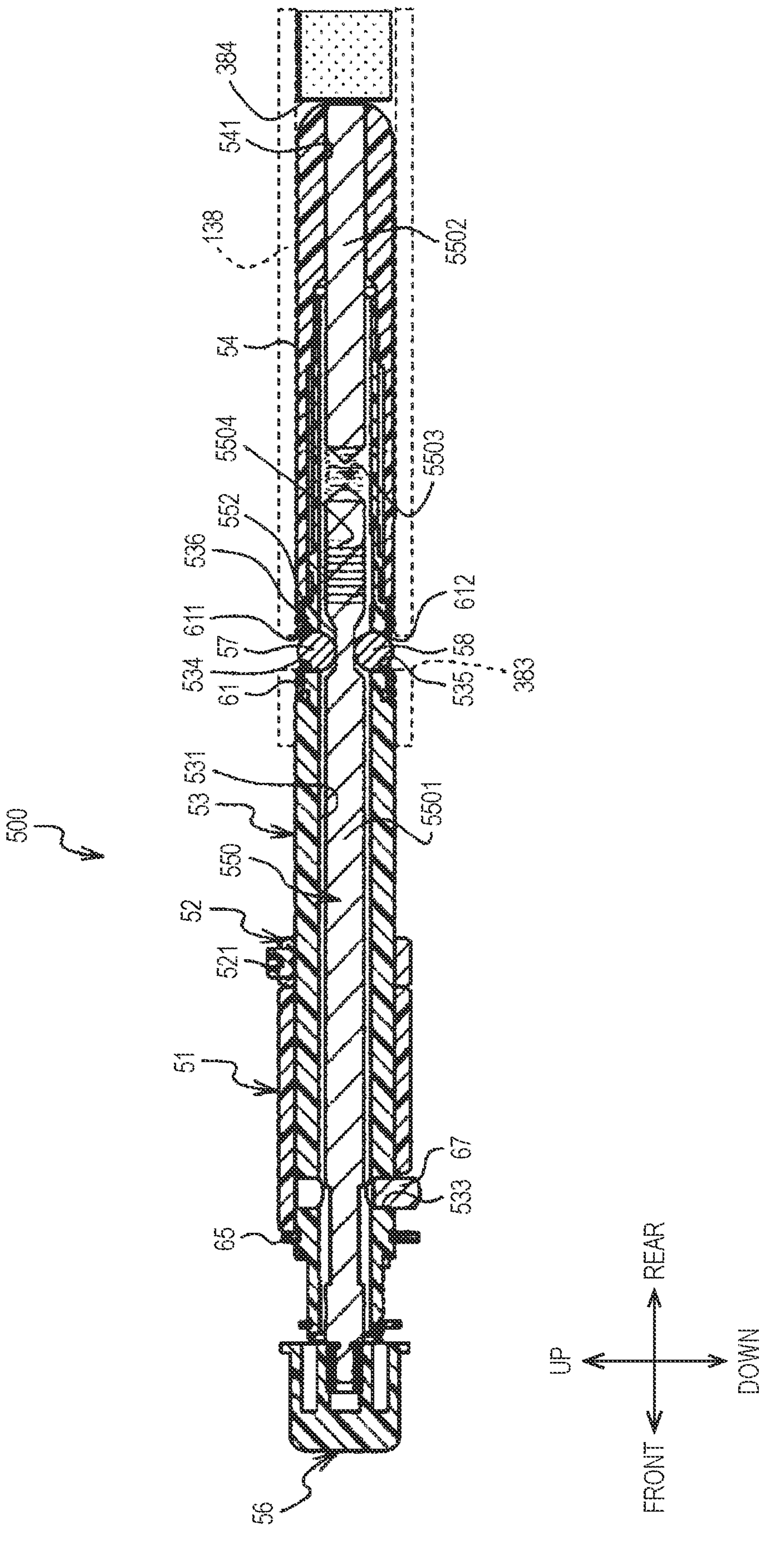
FIG. 16 is a cross-sectional view showing a state where locking of the locating shaft 50 is released.

As shown in FIG. 15, when the locating shaft 500 is pushed into an innermost part of the cylindrical guide body 138, positions of the exposure holes 611 and 612 are respectively aligned with positions of the pair of engaged holes 384, and the balls 57 and 58 are released from interference with the inner wall of the guide cylinder 138 to protrude outward. Accordingly, the first shaft 5501 biased by the compression spring 5503 also moves forward with respect to the guide shaft 53 and the cap 54. Therefore, the balls 57 and 58 are pushed toward the outer side in the radial direction by an outer peripheral surface of the portion of the outer peripheral surface of the first shaft 5501 behind the recessed portion 552, and a part of each of the balls 57 and 58 protrudes from a respective one of the engaged holes 384 via a respective one of the exposure holes 611 and 612 to lock the locating shaft 500. By movement of the center shaft 550 (first shaft 5501), the release button 56 also moves forward from the guide shaft 53 and the cap 54 to transition to a state where the release button 56 can be pressed. The biasing spring 5504 is in a compressed state. As a result, the locating shaft 50 is in a locked state of being locked to the cylindrical guide body 38, and the cassette 4 is mounted to the main body 3.

As described above, in the printing device 1, guiding and locking of the locating shaft 500 can be simultaneously performed by only one action of inserting the locating shaft 500 into the cylindrical guide body 138, so that operability can be improved. By disengaging each of the balls 57 and 58 from the engaged hole 383, the locked state can be easily released.

A method for releasing the locking of the locating shaft 500 to pull out the locating shaft 500 from the cylindrical guide body 138 will be described. In a state shown in FIG. 15, the user presses the release button 56 rearward against the spring force of the compression spring 5503 with a thumb of a hand with which the handle 42 is gripped while gripping the handle 42 of the cassette 4. Then, the first shaft 5501 is pushed rearward, so that the positional relationship between the recessed portion 552 and the balls 57 and 58 changes, and the locating shaft 500 changes from the locked state (see FIG. 15) to a released state (see FIG. 16). The user pulls out the locating shaft 500 from the cylindrical guide body 138 by pulling the handle 42 forward. At this time, since each of the balls 57 and 58 is pushed into the inside of the guide shaft 53 by the inner edge portion of a respective one of the exposure holes 611 and 612, the locking to the cylindrical guide body 138 is released. As a result, the user can easily pull out the locating shaft 500 from the cylindrical guide body 138, and can easily remove the cassette 4 from the main body 3. When the locating shaft 500 is pulled out and the cap 54 is separated from the abutment portion 384, the second shaft 5502 can protrude from the rear end of the cap, and the spring force of the compression spring 5503 generated when the release button 56 is pressed is released. The biasing spring 5504 also returns from the compressed state to a released state. As a result, a state where the release button 56 is pushed rearward is maintained, and the locating shaft 500 is switched to the initial state shown in FIG. 14.

In the above second embodiment, since the balls 57 and 58 do not protrude from the beginning of mounting, the balls 57 and 58 almost do not interfere with the cylindrical guide body 138. Therefore, the user can mount the cassette 4 to the main body 3 with a small force without feeling the resistance. Since the interference does not occur, damage due to wear or the like of the balls 57 and 58 can be made extremely small.

In the above description, the locating shaft 500 is an example of the "shaft" in the present disclosure. The exposure holes 611 and 612 are examples of an "opening portion" in the present disclosure. The balls 57 and 58 are examples of a "spherical body" in the present disclosure. The release button 56 is an example of an "operation unit" in the present disclosure. The compression spring 5503 is an example of a "third biasing member" in the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing device, comprising:

a main body having a head support surface on which a thermal head is supported; and a cassette including a plate-shaped cassette base, a supply roll shaft, and a winding roll shaft, and detachably attached to the head support surface of the main body along an axis direction of the supply roll shaft and the winding roll shaft, the supply roll shaft rotatably supporting a ribbon supply roll and being provided on one side, in a predetermined direction, of a facing surface of the cassette base facing the head support surface, and the winding roll shaft rotatably supporting a ribbon winding roll and being provided on an other side, in the predetermined direction, of the facing surface, wherein the printing device is configured to perform printing by transferring ink of an ink ribbon onto a print medium due to heating of the thermal head, the ink ribbon being fed out from the ribbon supply roll and wound around the ribbon winding roll through the thermal head, and wherein the printing device further comprises:

a guided portion provided on the facing surface of the cassette base;

a guide portion provided at a position facing the guided portion on the head support surface of the main body, and configured to guide and locate the guided portion to a predetermined position on a side of the head support surface along the axis direction;

a lock unit provided in the guided portion and configured to lock the guided portion to the guide portion in a state where the guided portion is located at the predetermined position by the guide portion;

a release unit configured to release locking performed by the lock unit; and a grip portion provided on an outer surface of the cassette base on a side opposite to the facing surface, and configured to be gripped by a user, wherein the release unit is provided in the grip portion.

2. The printing device according to claim 1, wherein the guided portion is provided between the supply roll shaft and the winding roll shaft in the predetermined direction on the facing surface of the cassette base, and is provided, in a state where the cassette is mounted, at a location on a side opposite to the thermal head with respect to the supply roll shaft in an orthogonal direction that is orthogonal to the predetermined direction and the axis direction.

3. The printing device according to claim 1, wherein the guided portion includes a rod-shaped shaft extending from the facing surface toward a side of the head support surface in parallel with the axis direction, wherein the guide portion includes a cylindrical guide body extending from the head support surface toward a side of the facing surface in parallel with the axis direction, and configured to guide and locate the shaft to the predetermined position by inserting the shaft inside the cylindrical guide body, wherein the lock unit includes:

an engagement portion provided to be cable of protruding from an opening portion from an inner side toward an outer side of the shaft in a radial direction, and being engageable with an engaged hole through the opening portion in a state where the shaft is guided to the predetermined position by the cylindrical guide body, the opening portion being provided on an outer peripheral surface of the shaft, and the engaged hole being provided in an outer peripheral surface of the cylindrical guide body, and wherein the release unit is provided in the shaft, and is configured to move the engagement portion to the inner side in the radial direction to disengage the engagement portion from the engaged hole.

4. The printing device according to claim 3, wherein the shaft includes:

a cylindrical holder fixed to the facing surface and extending in parallel with the axis direction toward the side of the head support surface; and a cylindrical guide shaft coaxially disposed in the holder and extending from a tip end portion of the holder toward the side of the head support surface, the tip end portion facing the side of the head support surface, wherein the release unit includes:

a rod-shaped center shaft disposed in the holder and the guide shaft, and provided to be movable along a length direction of the holder and the guide shaft, wherein the lock unit includes:

a first biasing member configured to constantly bias the center shaft toward a side of the cassette base, wherein the engagement portion is a spherical body, and is provided between the guide shaft and the center shaft, the spherical body being disposed to be slidable on an outer peripheral surface of the center shaft, and a part of the spherical body being exposed from the opening portion to engage with the engaged hole in a first state where the spherical body is in contact with the outer peripheral surface of the center shaft moved toward the side of the cassette base by the first biasing member, wherein a recessed portion recessed toward an inner side of the center shaft in a radial direction is provided on the outer peripheral surface of the center shaft at a position closer to the side of the cassette base than a position with which the part of the spherical body is in contact in the first state, and wherein the release unit is configured to shift from the first state to a second state where the spherical body is in contact with the recessed portion and to disengage the spherical body from the engaged hole by moving the center shaft toward the side of the head support surface against a biasing force of the first biasing member and disposing the recessed portion at a position of the spherical body, to release the locking.

5. The printing device according to claim 4, wherein the guide shaft is supported in the holder to be rotatable about an axis, and wherein the printing device comprises:

a second biasing member provided in the holder and configured to constantly bias the guide shaft in one direction about the axis; and a guide groove provided on the outer peripheral surface of the cylindrical guide body, extending from one end portion of the cylindrical guide body toward the engaged hole to be inclined in a direction opposite to the one direction about the axis, and configured to guide the part of the spherical body exposed from the opening portion from the one end portion to the engaged hole, the one end portion facing the side of the cassette base.

6. The printing device according to claim 5, wherein the second biasing member is a torsion coil spring.

7. The printing device according to claim 4, wherein the release unit includes an operation unit fixed to one end portion of the center shaft located on a side of the holder, and configured to push the center shaft toward the side of the head support surface.

8. The printing device according to claim 3, wherein the shaft includes:

a cylindrical holder fixed to the facing surface and extending in parallel with the axis direction toward the side of the head support surface; and a cylindrical guide shaft coaxially disposed in the holder and extending from a tip end portion of the holder toward the side of the head support surface, the tip end portion facing the side of the head support surface, wherein the release unit includes:

a rod-shaped first shaft and a rod-shaped second shaft disposed in the holder and the guide shaft, and coaxially provided to be movable along a length direction of the holder and the guide shaft, wherein the cylindrical guide body includes an abutment portion configured to, in a state where the cassette is mounted to the main body, abut against the second shaft to restrict the guide shaft from moving toward the side of the head support surface in the length direction of the guide shaft, wherein the lock unit includes:

a third biasing member disposed between the first shaft and the second shaft, and configured to bias the first shaft toward a side of the cassette base in a state where the cassette is mounted to the main body, wherein the engagement portion is a spherical body, and is provided between the first shaft and the center shaft, the spherical body being disposed to be slidable on an outer peripheral surface of the first shaft, and a part of the spherical body being exposed from the opening portion to engage with the engaged hole in a locked state where the spherical body is in contact with the outer peripheral surface of the first shaft moved toward the side of the cassette base by the third biasing member, wherein a recessed portion recessed toward an inner side of the first shaft in a radial direction is provided on the outer peripheral surface of the first shaft at a position closer to the side of the cassette base than a position with which the part of the spherical body is in contact in the locked state, and wherein the release unit is configured to shift from the locked state to a released state where the spherical body is in contact with the recessed portion and to disengage the spherical body from the engaged hole by moving the first shaft toward the side of the head support surface against a biasing force of the third biasing member and disposing the recessed portion at a position of the spherical body, to release the locking.

* * * * *